(12) United States Patent
Nhan et al.

(10) Patent No.: US 8,334,226 B2
(45) Date of Patent: Dec. 18, 2012

(54) CONDUCTIVE WEBS CONTAINING ELECTRICAL PATHWAYS AND METHOD FOR MAKING SAME

(75) Inventors: Davis-Dang H. Nhan, Appleton, WI (US); Thomas Michael Ales, Neenah, WI (US); Thomas David Ehlert, Neenah, WI (US); Sudhanshu Gakhar, Neenah, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 635 days.

(21) Appl. No.: 12/474,024

(22) Filed: May 28, 2009

(65) Prior Publication Data
US 2009/0321238 A1    Dec. 31, 2009

Related U.S. Application Data

(60) Provisional application No. 61/130,220, filed on May 29, 2008.

(51) Int. Cl.
| | |
|---|---|
| *D04H 13/00* | (2006.01) |
| *B32B 5/26* | (2006.01) |
| *D01F 9/12* | (2006.01) |
| *H01B 3/50* | (2006.01) |
| *H01B 5/16* | (2006.01) |
| *G09F 13/00* | (2006.01) |
| *H05B 3/34* | (2006.01) |
| *H01H 9/54* | (2006.01) |
| *H01H 13/14* | (2006.01) |

(52) U.S. Cl. ........ 442/349; 442/381; 442/391; 442/414; 442/415; 423/447.1; 174/124 R; 174/126.1; 40/541; 219/529; 200/5 A; 200/534; 2/905

(58) Field of Classification Search .................. 442/327; 428/195.1, 196; 423/447.1; 174/126.1; 427/96.1–97.6; 156/73.1–73.2
See application file for complete search history.

(56) References Cited

U.S. PATENT DOCUMENTS

| | | | |
|---|---|---|---|
| 3,120,342 A | 2/1964 | Geiger | |
| 3,148,107 A | 9/1964 | Selke et al. | |
| 3,265,557 A | 8/1966 | Fries et al. | |
| 3,367,851 A * | 2/1968 | Filreis et al. | ............. 205/52 |

(Continued)

FOREIGN PATENT DOCUMENTS
EP    1 674 036 A1    6/2006
(Continued)

OTHER PUBLICATIONS

"Continuous Low-Level Heat Wrap Therapy for the Prevention and Early Phase Treatment of Delayed-Onset Muscle Soreness of the Low Back: A Randomized Controlled Trial", Mayer et al., Arch Phys Med Rehabil, vol. 87, Oct. 2006, pp. 1310-1317. "Continuous Low-Level Heat Wrap Therapy Is Effective for Treating Wrist Pain", Michlovitz et al., Arch Phys Med Rehabil, vol. 85, Sep. 2004, pp. 1409-1416.
"Efficacy of rehabilitative therapy in regional musculoskeletal conditions", E. Y. Hanada, Best Practice & Research Clinical Rheumatology, vol. 17, No. I, 2003, pp. 151-166.

(Continued)

*Primary Examiner* — Jennifer A Steele
(74) *Attorney, Agent, or Firm* — Dority & Manning, P.A.

(57) ABSTRACT

Presented is a variety of products and apparatuses employing a conductive nonwoven web. Products and apparatuses include an RFID system, a radiofrequency shielding system, a flexible electronic circuit component, a heating element, an antenna, an electromagnetic energy shield, a membrane switch, a keypad, and a packaging system. In one embodiment, the conductive nonwoven web contains conductive carbon fibers in combination with pulp fibers and/or synthetic fibers. Electric pathways are formed into the conductive material using ultrasonic energy. The electric pathways can be used to produce various electronic devices.

26 Claims, 15 Drawing Sheets

U.S. PATENT DOCUMENTS

| | | | |
|---|---|---|---|
| 3,494,821 A | 2/1970 | Evans | |
| 3,539,296 A | 11/1970 | Selke | |
| 3,556,932 A | 1/1971 | Coscia et al. | |
| 3,556,933 A | 1/1971 | Williams et al. | |
| 3,585,104 A | 6/1971 | Kleinert | |
| 3,700,623 A | 10/1972 | Keim | |
| 3,772,076 A | 11/1973 | Keim | |
| 3,772,499 A | 11/1973 | Fritzsche | |
| 3,855,158 A | 12/1974 | Petrovich et al. | |
| 3,859,504 A | 1/1975 | Motokawa et al. | |
| 3,899,388 A | 8/1975 | Petrovich et al. | |
| 3,998,689 A | 12/1976 | Kitago et al. | |
| 4,032,607 A | 6/1977 | Schulz | |
| 4,100,324 A | 7/1978 | Anderson et al. | |
| 4,115,917 A | 9/1978 | Charon et al. | |
| 4,129,528 A | 12/1978 | Petrovich et al. | |
| 4,144,370 A | 3/1979 | Boulton | |
| 4,147,586 A | 4/1979 | Petrovich et al. | |
| 4,222,921 A | 9/1980 | Van Eenam | |
| 4,250,397 A * | 2/1981 | Gray et al. | 392/435 |
| 4,256,801 A | 3/1981 | Chuluda | |
| 4,347,104 A | 8/1982 | Dressler | |
| 4,514,345 A | 4/1985 | Johnson et al. | |
| 4,523,086 A | 6/1985 | Eilentropp | |
| 4,528,239 A | 7/1985 | Trokhan | |
| 4,534,886 A | 8/1985 | Kraus et al. | |
| 4,594,130 A | 6/1986 | Chang et al. | |
| 4,606,790 A | 8/1986 | Youngs et al. | |
| 4,704,116 A | 11/1987 | Enloe | |
| 4,728,395 A | 3/1988 | Boyd, Jr. | |
| 4,793,898 A | 12/1988 | Laamanen et al. | |
| 4,820,170 A | 4/1989 | Redmond et al. | |
| 4,857,377 A | 8/1989 | Daimon et al. | |
| 4,888,234 A | 12/1989 | Smith et al. | |
| 4,909,901 A | 3/1990 | McAllister et al. | |
| 4,940,464 A | 7/1990 | Van Gompel et al. | |
| 4,960,979 A | 10/1990 | Nishimura | |
| 5,004,511 A | 4/1991 | Tamura et al. | |
| 5,098,522 A | 3/1992 | Smurkoski et al. | |
| 5,129,988 A | 7/1992 | Farrington, Jr. | |
| 5,206,466 A | 4/1993 | Inamiya | |
| 5,260,171 A | 11/1993 | Smurkoski et al. | |
| 5,275,700 A | 1/1994 | Trokhan | |
| 5,284,703 A | 2/1994 | Everhart et al. | |
| 5,312,678 A | 5/1994 | McCullough, Jr. et al. | |
| 5,324,579 A | 6/1994 | Sassa et al. | |
| 5,328,565 A | 7/1994 | Rasch et al. | |
| 5,334,289 A | 8/1994 | Trokhan et al. | |
| 5,350,624 A | 9/1994 | Georger et al. | |
| 5,398,046 A * | 3/1995 | Szegedi et al. | 345/174 |
| 5,429,686 A | 7/1995 | Chiu et al. | |
| 5,431,786 A | 7/1995 | Rasch et al. | |
| 5,486,166 A | 1/1996 | Bishop et al. | |
| 5,490,846 A | 2/1996 | Ellis et al. | |
| 5,496,624 A | 3/1996 | Stelljes, Jr. et al. | |
| 5,500,277 A | 3/1996 | Trokhan et al. | |
| 5,514,523 A | 5/1996 | Trokhan et al. | |
| 5,529,665 A | 6/1996 | Kaun | |
| 5,554,467 A | 9/1996 | Trokhan et al. | |
| 5,565,170 A | 10/1996 | Sakamoto | |
| 5,566,724 A | 10/1996 | Trokhan et al. | |
| 5,582,757 A | 12/1996 | Kio et al. | |
| 5,595,628 A | 1/1997 | Gordon et al. | |
| 5,624,790 A | 4/1997 | Trokhan et al. | |
| 5,628,876 A | 5/1997 | Ayers et al. | |
| 5,656,132 A | 8/1997 | Farrington, Jr. et al. | |
| 5,672,248 A | 9/1997 | Wendt et al. | |
| 5,766,389 A | 6/1998 | Brandon et al. | |
| 5,808,554 A | 9/1998 | Shuminov | |
| 5,820,973 A | 10/1998 | Dodge, II et al. | |
| 6,071,836 A | 6/2000 | St. Lawrence et al. | |
| 6,096,169 A | 8/2000 | Hermans et al. | |
| 6,120,642 A | 9/2000 | Lindsay et al. | |
| 6,143,135 A | 11/2000 | Hada et al. | |
| 6,163,262 A | 12/2000 | Wu | |
| 6,197,154 B1 | 3/2001 | Chen et al. | |
| 6,224,714 B1 | 5/2001 | Schroeder et al. | |
| 6,274,667 B1 | 8/2001 | Shannon et al. | |
| 6,287,418 B1 | 9/2001 | Schroeder et al. | |
| 6,315,864 B2 | 11/2001 | Anderson et al. | |
| 6,365,667 B1 | 4/2002 | Shannon et al. | |
| 6,474,367 B1 | 11/2002 | Jayaraman et al. | |
| 6,540,874 B1 | 4/2003 | Ling-Chen | |
| 6,585,162 B2 * | 7/2003 | Sandbach et al. | 235/462.44 |
| 6,593,555 B2 | 7/2003 | Hayashi | |
| 6,596,533 B1 | 7/2003 | Erbs et al. | |
| 6,642,467 B2 * | 11/2003 | Farringdon | 200/511 |
| 6,645,190 B1 | 11/2003 | Olson et al. | |
| 6,736,935 B2 | 5/2004 | Hermans et al. | |
| 6,887,348 B2 | 5/2005 | Hermans et al. | |
| 6,953,516 B2 | 10/2005 | Hermans et al. | |
| 7,004,994 B2 | 2/2006 | Hampden-Smith et al. | |
| 7,022,630 B2 * | 4/2006 | Berman et al. | 442/365 |
| 7,157,134 B2 | 1/2007 | Makela et al. | |
| 7,269,914 B2 | 9/2007 | Lee | |
| 7,468,579 B2 | 12/2008 | Hiraki | |
| 7,477,156 B2 | 1/2009 | Long et al. | |
| 7,597,769 B2 | 10/2009 | Hampden-Smith et al. | |
| 7,612,673 B2 | 11/2009 | Onderko et al. | |
| 7,737,322 B2 | 6/2010 | Ales, III et al. | |
| 7,779,521 B2 | 8/2010 | Topolkaraev et al. | |
| 7,862,045 B2 | 1/2011 | Hodge | |
| 2002/0058179 A1 | 5/2002 | Segit et al. | |
| 2002/0123289 A1 | 9/2002 | DeAngelis et al. | |
| 2003/0155347 A1 | 8/2003 | Oh et al. | |
| 2003/0203693 A1 * | 10/2003 | Delanoy et al. | 442/327 |
| 2004/0053552 A1 | 3/2004 | Child et al. | |
| 2006/0094320 A1 | 5/2006 | Chen et al. | |
| 2006/0238436 A1 | 10/2006 | Deaett et al. | |
| 2006/0264796 A1 | 11/2006 | Flick et al. | |
| 2008/0058744 A1 * | 3/2008 | Tippey et al. | 604/361 |
| 2009/0036012 A1 | 2/2009 | Nhan et al. | |
| 2009/0263642 A1 * | 10/2009 | Handa et al. | 428/297.4 |
| 2009/0321238 A1 | 12/2009 | Nhan et al. | |
| 2010/0155006 A1 | 6/2010 | Ales et al. | |

FOREIGN PATENT DOCUMENTS

| | | |
|---|---|---|
| EP | 1 118 085 B1 | 7/2006 |
| EP | 1050608 B1 | 7/2006 |
| GB | 2 250 121 A | 5/1992 |
| JP | 2002-266216 | 9/2002 |
| JP | 2002-266217 | 9/2002 |
| JP | 2004-306389 | 11/2004 |
| JP | 2004-342509 | 12/2004 |
| WO | WO 9607488 A1 | 3/1996 |
| WO | WO 99/34057 A1 | 7/1999 |
| WO | WO 00/37009 A2 | 6/2000 |
| WO | WO 00/66835 A1 | 11/2000 |
| WO | WO 02/16920 A2 | 2/2002 |

OTHER PUBLICATIONS

"The Effect of Heat on Tissue Extensibility: A Comparison of Deep and Superficial Heating", Robertson et al., Arch Phys Med Rehabil, vol. 86, Apr. 2005, pp. 819-825.

"The Temperature Dependence of Dynamic Viscosity for Some Vegetable Oils", Abramovic et al., Acta Chim. Slov. 1998, 45(1), pp. 69-77.

Hoon, S.R. et al.,"Time-dependent resistivity in carbon fibre sheets", *Journal of Materials Science 20*, pp. 3311-3319, 1985.

Jang, Joan and S.K. Ryu, "Physical property and electrical conductivity of electroless Ag-plated carbon fiber-reinforced paper", *Journal of Materials Processing Technology 180*, pp. 66-73, 2006.

Van Heest, Cara, "Electrolux, Kimberly Clark and the Printed Electronics Uptake", *Printed Electronics World*—http://www.printedelectronicsworld.com/articles/electrolux_kimberly_clark_and_the_printed_electronics_uptake_00002094.asp, Mar. 10, 2010.

European Search Report for Appl. No. EP09754303 dated Jun. 20, 2011.

International Search Report Appl. No. PCT/IB2009/052260 dated Jan. 14, 2010.

\* cited by examiner

CONDUCTIVE WEBS CONTAINING ELECTRICAL PATHWAYS AND METHOD FOR MAKING SAME

RELATED APPLICATION

The present application is based on and claims priority to U.S. Provisional Patent Application Ser. No. 61/130,220, filed on May 29, 2008.

BACKGROUND

Various efforts have been made in the recent past to incorporate electronic devices into different types of products. For example, simple electronic devices have been placed in various articles of clothing in order to create a unique product having greater consumer appeal. Electronic devices have also been incorporated into products in order to provide a specific function. For instance, those skilled in the art have proposed incorporating electronic devices, including RFID devices, into various packaging for inventory control or for other purposes.

Electric devices have also been proposed for use in portable monitors in the medical care industry. For instance, in one embodiment, the monitor may be placed on a hospital gown or other similar garment and be configured to monitor at least one condition of the patient while allowing the patient to move around the hospital or to be moved within the hospital.

Many electronic devices as described above are constructed to be light weight and as inexpensive as possible. Thus, the devices have been made using flexible substrates, such as paper, woven fabrics, nonwoven fabrics and polymer films. In the past, electrical circuits have been incorporated into the devices by using conductive inks that are printed onto the flexible substrates.

Various problems, however, have been encountered in the past in using conductive inks. For instance, the inks are not only relatively expensive, but problems have been experienced in printing the inks on porous substrates, such as textile materials. When the conductive inks have been printed on porous materials, for instance, the level of electrical conductivity has been excessively degraded. In addition, the printing process typically has to be conducted off-line adding complexity to the manufacturing process and further expense to the overall product.

In view of the above, a need currently exists for a relatively inexpensive way to design and produce electrical circuits for incorporation into various electronic devices.

SUMMARY

In general, the present disclosure is directed to the use of one or more nonwoven materials in order to construct an electronic device. More particularly, the nonwoven material made in accordance with the present disclosure is conductive by containing conductive fibers, such as carbon fibers. An electrical pathway is formed in the conductive nonwoven web by forming non-conductive zones in the web. In accordance with the present disclosure, the non-conductive zones are formed by subjecting the conductive web to ultrasonic energy. It has been discovered that ultrasonic energy can shatter and disintegrate the conductive fibers thereby creating the non-conductive zones.

The electrical pathway formed in the nonwoven web can vary depending upon the particular application. In one embodiment, for instance, an electrical circuit can be formed in the nonwoven material. The electrical circuit may comprise, for instance, a close circuit or an open circuit.

Conductive nonwoven materials can be made in accordance with the present disclosure at relatively high speeds and at relatively low cost. In fact, the conductive nonwoven webs can be designed to be incorporated into disposable products, such as absorbent articles, medical products, and the like.

In one embodiment, for instance, the present disclosure is directed to a product for use in constructing electronic devices. The product includes a conductive nonwoven web comprising conductive fibers and non-conductive fibers. The conductive fibers may comprise non-metallic fibers, such as carbon fibers. The carbon fibers, for instance, can have a purity of greater than about 85%, such as greater than about 88%, such as greater than about 90%, such as even greater than about 92%. The carbon fibers can have any suitable length, such as from about 1 mm to about 6 mm.

The conductive fibers can be present in the nonwoven web in an amount generally from about 5% by weight to about 50% by weight. For instance, in one embodiment, the conductive fibers may be present in the web in an amount from about 5% by weight to about 25% by weight.

As described above, the nonwoven web, in addition to containing carbon fibers, can contain non-conductive fibers. The non-conductive fibers, for example, may comprise pulp fibers, synthetic fibers, or mixtures thereof. The synthetic fibers when present can be made from a thermoplastic polymer.

In order to form the non-conductive zones, the ultrasonic energy may be applied to the nonwoven web using, for instance, an ultrasonic bonding horn. The ultrasonic energy may, for instance, have a frequency from about 20 kHz to about 40 kHz. In one embodiment, ultrasonic energy can be applied to the nonwoven web in amounts sufficient such that the non-conductive zones have a resistance that is at least four times greater than the resistance of the conductive zones contained in the web.

In addition to creating non-conductive zones, the ultrasonic energy can also be used for other purposes. For instances, applying ultrasonic energy to the web can cause bonding with an adjacent web.

In fact, in one embodiment, in addition to bonding two adjacent webs together and/or producing one or more non-conductive zones, the ultrasonic energy can also be used to establish an electrical connection between the two opposing webs. For example, an electrical connection can be established adjacent to non-conductive zones.

Multilayer products, for instance, can be used to construct various electronic devices. For example, in one embodiment, a switch can be made from a conductive nonwoven web made in accordance with the present disclosure. The electronic switch, for instance, can include a conductive nonwoven web as described above spaced from an opposing conductive layer that may also comprise a conductive nonwoven web. The two conductive layers are spaced apart, but form an electrical connection when the conductive nonwoven web and the opposing conductive layer are pressed together. In one embodiment, a non-conductive layer can be positioned in between the two conductive layers. The non-conductive layer, for instance, can include an aperture through which an electrical connection is made between the conductive nonwoven web and the opposing conductive layer.

Another electronic device that can be made in accordance with the present disclosure comprises a keyboard. The keyboard, for instance, can define an exterior surface designating a plurality of keys. The keys can include letter designations, number designations, or a combination of both. A first conductive layer is positioned below the key and spaced from a second conductive layer. At least one of the conductive layers comprises a nonwoven web made in accordance with the present disclosure. When one of the keys is pressed, an electrical connection is made between the first conductive layer and the second conductive layer. In addition, the conductive layers can form a pathway when connected together that indicates which corresponding key has been pressed. In accordance with the present disclosure, these pathways can be formed using ultrasonically treated areas.

The keyboard can be made containing various layers. In one embodiment, for instance, the keyboard may contain three layers including two conductive nonwoven webs made in accordance with the present disclosure separated by a non-conductive layer. In this embodiment, the keyboard can be printed directly on the outer nonwoven web. The non-conductive layer may be made from any suitable non-conductive material and may contain apertures that correspond in location to each of the keys located on the exterior surface of the keyboard.

In an alternative embodiment, the keyboard may include a five layer construction. In this embodiment, in addition to the three layers described above, the keyboard can further include a cover layer and a backing layer. A first conductive layer, the non-conductive layer and a second conductive layer may be positioned in between the cover layer and the backing layer. The cover layer may include an exterior surface that displays the keys.

Other features and aspects of the present disclosure are discussed in greater detail below.

BRIEF DESCRIPTION OF THE DRAWINGS

The foregoing and other features and aspects of the present disclosure and the manner of attaining them will become more apparent, and the disclosure itself will be better understood by reference to the following description, appended claims and accompanying drawings, where:

DETAILED DESCRIPTION

Figure 1:
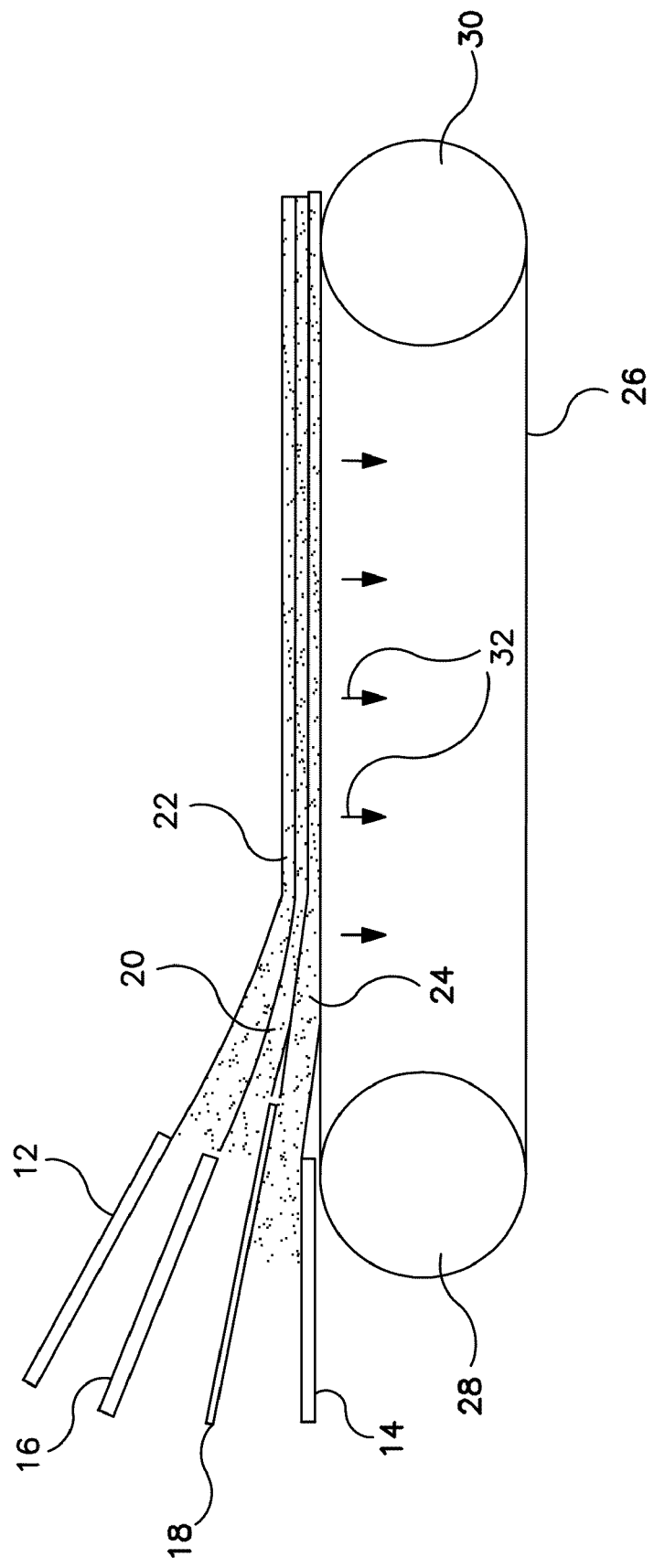
FIG. 1 is a side view of one aspect of a process for forming multi-layered webs in accordance with the present disclosure.

It is to be understood by one of ordinary skill in the art that the present discussion is a description of exemplary aspects of the present disclosure only, and is not intended as limiting the broader aspects of the present disclosure.

The present disclosure is generally directed to products including a conductive element. Some products described herein are disposable, meaning that they are designed to be discarded after a limited use rather than being laundered or otherwise restored for reuse.

In general, the present disclosure is directed to conductive nonwoven materials containing conductive zones and non-conductive zones. The nonwoven materials contain conductive fibers combined with at least one other type of fiber. The other type of fiber may comprise, for instance, pulp fibers, synthetic fibers, or mixtures thereof. The conductive fibers are present within the material in an amount sufficient so that the material is conductive in at least one direction.

In accordance with the present disclosure, non-conductive zones are formed in the conductive material by applying ultrasonic energy to the material in particular locations. The ultrasonic energy is believed to shatter the conductive fibers in a manner that creates electrical discontinuity in the web. Of particular advantage, the ultrasonic energy can be applied to the material using, for instance, a rotary horn that allows the ultrasonic energy to contact the web at particular and controlled locations. In this manner, a pattern of non-conductive zones can be formed in the web for creating electrical pathways. The electrical pathways can then be used to complete an electric circuit in an electronic device. In this manner, electronic devices can be produced according to the present disclosure that includes circuitry that is not only lightweight and flexible, but which can be produced at relatively low cost. In addition, simple circuits and switches can be produced in the nonwoven material at relatively high speeds, such as speeds greater than 200 feet per minute, which allows the process to be integrated in line during production of the electronic device or other article.

Conductive webs made in accordance with the present disclosure can be produced using different techniques and methods. For instance, in one embodiment, the conductive nonwoven webs can contain a substantial amount of pulp fibers and can be made using a paper making process or other similar wet lay process. In other embodiments, the conductive nonwoven webs can be made containing a substantial amount of synthetic fibers. When containing substantial amounts of synthetic fibers, the webs can be made using a wet laid process or can be formed using other web making techniques. For instance, in one embodiment, conductive fibers alone or in combination with pulp fibers can be combined with molten synthetic fibers in a process for forming a coform web. In still another embodiment, conductive fibers alone or in combination with pulp fibers can be hydroentangled with a preformed nonwoven web, such as a spunbond web.

The conductive fibers that may be used in accordance with the present disclosure can vary depending upon the particular application and the desired result. Conductive fibers that may be used to form the nonwoven webs include carbon fibers, metallic fibers, conductive polymeric fibers including fibers made from conductive polymers or polymeric fibers containing a conductive material, and mixtures thereof. Metallic fibers that may be used include, for instance, copper fibers, aluminum fibers, and the like. Polymeric fibers containing a conductive material include thermoplastic fibers coated with a conductive material or thermoplastic fibers impregnated or blended with a conductive material. For instance, in one aspect, thermoplastic fibers that are coated with silver may be used.

Carbon fibers that may be used in the present disclosure include fibers made entirely from carbon or fibers containing carbon in amounts sufficient so that the fibers are electrically conductive. In one aspect, for instance, carbon fibers may be used that are formed from a polyacrylonitrile polymer. In particular, the carbon fibers are formed by heating, oxidizing, and carbonizing polyacrylonitrile polymer fibers. Such fibers typically have high purity and contain relatively high molecular weight molecules. For instance, the fibers can contain carbon in an amount greater than about 85% by weight, such as greater than about 88% by weight, such as greater than about 90% by weight, such as in an amount greater than 92% by weight, such as in an amount greater than about 95% by weight.

In order to form carbon fibers from polyacrylonitrile polymer fibers, the polyacrylonitrile fibers are first heated in an oxygen environment, such as air. While heating, cyano sites within the polyacrylonitrile polymer form repeat cyclic units of tetrahydropyridine. As heating continues, the polymer begins to oxidate. During oxidation, hydrogen is released causing carbon to form aromatic rings.

After oxidation, the fibers are then further heated in an oxygen starved environment. For instance, the fibers can be heated to a temperature of greater than about 1300° C., such as greater than 1400° C., such as from about 1300° C. to about 1800° C. During heating, the fibers undergo carbonization. During carbonization, adjacent polymer chains join together to form a lamellar, basal plane structure of nearly pure carbon.

Polyacrylonitrile-based carbon fibers are available from numerous commercial sources. For instance, such carbon fibers can be obtained from Toho Tenax America, Inc. located at Rockwood, Tenn. U.S.A.

Other raw materials used to make carbon fibers are rayon and petroleum pitch.

Of particular advantage, the formed carbon fibers can be chopped to any suitable length. In one aspect of the present disclosure, for instance, chopped carbon fibers may be incorporated into the base web having a length of from about 1 mm to about 12 mm, such as from about 3 mm to about 6 mm. The fibers can have an average diameter of from about 3 microns to about 15 microns, such as from about 5 microns to about 10 microns. In one aspect, for instance, the carbon fibers may have a length of about 3 mm and an average diameter of about 7 microns.

In one aspect, the carbon fibers incorporated into the nonwoven base webs have a water soluble sizing. Sizing can be in the amount of 0.1-10% by weight. Water soluble sizings, can be, but not limited to, polyamide compounds, epoxy resin ester, glycerin and poly(vinyl pyrrolidone). In this manner, the sizing is dissolved when mixing the carbon fibers in water to provide a good dispersion of carbon fibers in water prior to forming the nonwoven web.

In forming conductive nonwoven webs in accordance with the present disclosure, the above conductive fibers are combined with other fibers suitable for use in tissue making processes. The fibers combined with the conductive fibers may include any natural or synthetic cellulosic fibers including, but not limited to nonwoody fibers, such as cotton, abaca, kenaf, sabai grass, flax, esparto grass, straw, jute hemp, bagasse, milkweed floss fibers, and pineapple leaf fibers; and woody or pulp fibers such as those obtained from deciduous and coniferous trees, including softwood fibers, such as northern and southern softwood kraft fibers; hardwood fibers, such as eucalyptus, maple, birch, and aspen. Pulp fibers can be prepared in high-yield or low-yield forms and can be pulped in any known method, including kraft, sulfite, high-yield pulping methods and other known pulping methods. Fibers prepared from organosolv pulping methods can also be used, including the fibers and methods disclosed in U.S. Pat. No. 4,793,898, issued Dec. 27, 1988 to Laamanen et al.; U.S. Pat. No. 4,594,130, issued Jun. 10, 1986 to Chang et al.; and U.S. Pat. No. 3,585,104 issued Jun. 15, 1971 to Kleinert.

Useful fibers can also be produced by anthraquinone pulping, exemplified by U.S. Pat. No. 5,595,628 issued Jan. 21, 1997, to Gordon et al.

In one embodiment, softwood fibers are used to produce the nonwoven material. Softwood fibers tend to be longer which reduces particulate emission during manufacturing and converting. The longer pulp fibers also have a tendency to entangle better with the conductive fibers, such as the carbon fibers.

The pulp fibers incorporated into the nonwoven material, such as softwood fibers, can also be refined so as to increase the amount of bonding sites on each fiber. The increase in bonding sites increases the mechanical entanglement of the pulp fibers with the conductive fibers in the finished material. This allows for a very flat uniform paper with reduced carbon fiber fallout during processing. The refining action also increases the overall strength of the nonwoven material. For example, in one embodiment, the pulp fibers can have a Canadian Standard Freeness of greater than about 350 mL, such as greater than about 375 mL. For instance, the pulp fibers can be refined so as to have a Canadian Standard Freeness of from about 350 mL to about 600 mL.

A portion of the fibers, such as up to 100% or less by dry weight, can be synthetic fibers such as rayon, polyolefin fibers, polyester fibers, polyvinyl alcohol fibers, bicomponent sheath-core fibers, multi-component binder fibers, and the like. An exemplary polyethylene fiber is Pulpex®, available from Hercules, Inc. located at Wilmington, Del. U.S.A. Synthetic cellulose fiber types include rayon in all its varieties and other fibers derived from viscose or chemically-modified cellulose.

Incorporating thermoplastic fibers into the nonwoven web may provide various advantages and benefits. For example, incorporating thermoplastic fibers into the web may allow the webs to be thermally or ultrasonically bonded to adjacent structures. For instance, the webs may be thermally bonded to other nonwoven materials, such as a diaper liner which may include, for instance, a spunbond web or a meltblown web.

Chemically treated natural cellulosic fibers can also be used such as mercerized pulps, chemically stiffened or crosslinked fibers, or sulfonated fibers. For good mechanical properties in using papermaking fibers, it can be desirable that the fibers be relatively undamaged and largely unrefined or only lightly refined. Mercerized fibers, regenerated cellulosic fibers, cellulose produced by microbes, rayon, and other cellulosic material or cellulosic derivatives can be used. Suitable fibers can also include recycled fibers, virgin fibers, or mixes thereof. In certain aspects, the fibers can have a Canadian Standard Freeness of at least 200, more specifically at least 300, more specifically still at least 400, and most specifically at least 500.

Other papermaking fibers that can be used in the present disclosure include paper broke or recycled fibers and high yield fibers. High yield pulp fibers are those papermaking fibers produced by pulping processes providing a yield of about 65% or greater, more specifically about 75% or greater, and still more specifically about 75% to about 95%. Yield is the resulting amount of processed fibers expressed as a percentage of the initial wood mass. Such pulping processes include bleached chemithermomechanical pulp (BCTMP), chemithermomechanical pulp (CTMP), pressure/pressure thermomechanical pulp (PTMP), thermomechanical pulp (TMP), thermomechanical chemical pulp (TMCP), high yield sulfite pulps, and high yield Kraft pulps, all of which leave the resulting fibers with high levels of lignin. High yield fibers are well known for their stiffness in both dry and wet states relative to typical chemically pulped fibers.

Flame resistant fiber, such as PANEX®, available from Zoltek Corporation located at Bridgeton, Mo. U.S.A. can also be used in the present disclosure to provide flame resistant to the conductive sheet.

In general, any wet-laid process capable of forming a tissue web can be utilized in forming the conductive web. For example, a papermaking process of the present disclosure can utilize embossing, wet pressing, air pressing, through-air drying, uncreped through-air drying, hydroentangling, air laying, as well as other steps known in the art. The tissue web may be formed from a fiber furnish containing pulp fibers in an amount of at most 96% by weight. A fiber furnish also contains thermoplastic fiber in an amount of at most 96% by weight.

The nonwoven webs can also be pattern densified or imprinted, such as the tissue sheets disclosed in any of the following U.S. Pat. No. 4,514,345 issued on Apr. 30, 1985, to Johnson et al.; U.S. Pat. No. 4,528,239 issued on Jul. 9, 1985, to Trokhan; U.S. Pat. No. 5,098,522 issued on Mar. 24, 1992 to Smurkoski et al.; U.S. Pat. No. 5,260,171 issued on Nov. 9, 1993, to Smurkoski et al.; U.S. Pat. No. 5,275,700 issued on Jan. 4, 1994, to Trokhan; U.S. Pat. No. 5,328,565 issued on Jul. 12, 1994, to Rasch et al.; U.S. Pat. No. 5,334,289 issued on Aug. 2, 1994, to Trokhan et al.; U.S. Pat. No. 5,431,786 issued on Jul. 11, 1995, to Rasch et al.; U.S. Pat. No. 5,496,624 issued on Mar. 5, 1996, to Steltjes, Jr. et al.; U.S. Pat. No. 5,500,277 issued on Mar. 19, 1996, to Trokhan et al.; U.S. Pat. No. 5,514,523 issued on May 7, 1996, to Trokhan et al.; U.S. Pat. No. 5,554,467 issued on Sep. 10, 1996, to Trokhan et al.; U.S. Pat. No. 5,566,724 issued on Oct. 22, 1996, to Trokhan et al.; U.S. Pat. No. 5,624,790 issued on Apr. 29, 1997, to Trokhan et al.; and, U.S. Pat. No. 5,628,876 issued on May 13, 1997, to Ayers et al., the disclosures of which are incorporated herein by reference to the extent that they are non-contradictory herewith. Such imprinted tissue sheets may have a network of densified regions that have been imprinted against a drum dryer by an imprinting fabric, and regions that are relatively less densified (e.g., "domes" in the tissue sheet) corresponding to deflection conduits in the imprinting fabric, wherein the tissue sheet superposed over the deflection conduits was deflected by an air pressure differential across the deflection conduit to form a lower-density pillow-like region or dome in the tissue sheet.

The tissue web can also be formed without a substantial amount of inner fiber-to-fiber bond strength. In this regard, the fiber furnish used to form the base web can be treated with a chemical debonding agent. The debonding agent can be added to the fiber slurry during the pulping process or can be added directly to the headbox. Suitable debonding agents that may be used in the present disclosure include cationic debonding agents such as fatty dialkyl quaternary amine salts, mono fatty alkyl tertiary amine salts, primary amine salts, imidazoline quaternary salts, silicone quaternary salts and unsaturated fatty alkyl amine salts. Other suitable debonding agents are disclosed in U.S. Pat. No. 5,529,665 issued Jun. 25, 1996 to Kaun which is incorporated herein by reference. In particular, Kaun discloses the use of cationic silicone compositions as debonding agents.

In one aspect, the debonding agent used in the process of the present disclosure is an organic quaternary ammonium chloride and, particularly, a silicone-based amine salt of a quaternary ammonium chloride. For example, the debonding agent can be PROSOFT® TQ1003, marketed by the Hercules Incorporated, located at Wilmington, Del. U.S.A. The debonding agent can be added to the fiber slurry in an amount of from about 1 kg per metric tonne to about 10 kg per metric tonne of fibers present within the slurry.

In an alternative aspect, the debonding agent can be an imidazoline-based agent. The imidazoline-based debonding agent can be obtained, for instance, from the Witco Corporation, located at Greenwich, Conn. U.S.A. The imidazoline-based debonding agent can be added in an amount of between 2.0 to about 15 kg per metric tonne.

In one aspect, the debonding agent can be added to the fiber furnish according to a process as disclosed in PCT Application having an International Publication No. WO 99/34057 filed on Dec. 17, 1998 or in PCT Published Application having an International Publication No. WO 00/66835 filed on Apr. 28, 2000, which are both incorporated herein by reference. In the above publications, a process is disclosed in which a chemical additive, such as a debonding agent, is adsorbed onto cellulosic papermaking fibers at high levels. The process includes the steps of treating a fiber slurry with an excess of the chemical additive, allowing sufficient residence time for adsorption to occur, filtering the slurry to remove unadsorbed chemical additives, and redispersing the filtered pulp with fresh water prior to forming a nonwoven web.

Wet and dry strength agents may also be applied or incorporated into the base sheet. As used herein, "wet strength agents" refer to materials used to immobilize the bonds between fibers in the wet state. Typically, the means by which fibers are held together in paper and tissue products involve hydrogen bonds and sometimes combinations of hydrogen bonds and covalent and/or ionic bonds. In the present disclosure, it may be useful to provide a material that will allow bonding of fibers in such a way as to immobilize the fiber-to-fiber bond points and make them resistant to disruption in the wet state.

Any material that when added to a tissue sheet results in providing the tissue sheet with a mean wet geometric tensile strength:dry geometric tensile strength ratio in excess of about 0.1 will, for purposes of the present disclosure, be termed a wet strength agent. Typically these materials are termed either as permanent wet strength agents or as "temporary" wet strength agents. For the purposes of differentiating permanent wet strength agents from temporary wet strength agents, the permanent wet strength agents will be defined as those resins which, when incorporated into paper or tissue products, will provide a paper or tissue product that retains more than 50% of its original wet strength after exposure to water for a period of at least five minutes. Temporary wet strength agents are those which show about 50%, or less than, of their original wet strength after being saturated with water for five minutes. Both classes of wet strength agents find application in the present disclosure. The amount of wet strength agent added to the pulp fibers may be at least about 0.1 dry weight percent, more specifically about 0.2 dry weight percent or greater, and still more specifically from about 0.1 to about 3 dry weight percent, based on the dry weight of the fibers.

Permanent wet strength agents will typically provide a more or less long-term wet resilience to the structure of a tissue sheet. In contrast, the temporary wet strength agents will typically provide tissue sheet structures that had low density and high resilience, but would not provide a structure that had long-term resistance to exposure to water or body fluids.

The temporary wet strength agents may be cationic, non-ionic or anionic. Such compounds include PAREZ™ 631 NC and PAREZ® 725 temporary wet strength resins that are cationic glyoxylated polyacrylamide available from Cytec Industries located at West Paterson, N.J. U.S.A. This and similar resins are described in U.S. Pat. No. 3,556,932, issued on Jan. 19, 1971, to Coscia et al. and U.S. Pat. No. 3,556,933, issued on Jan. 19, 1971, to Williams et al. Hercobond 1366, manufactured by Hercules, Inc., located at Wilmington, Del., is another commercially available cationic glyoxylated polyacrylamide that may be used in accordance with the present disclosure. Additional examples of temporary wet strength agents include dialdehyde starches such as Cobond® 1000 from National Starch and Chemical Company located at Chicago, Ill. U.S.A. and other aldehyde containing polymers such as those described in U.S. Pat. No. 6,224,714, issued on May 1, 2001, to Schroeder et al.; U.S. Pat. No. 6,274,667, issued on Aug. 14, 2001, to Shannon et al.; U.S. Pat. No. 6,287,418, issued on Sep. 11, 2001, to Schroeder et al.; and U.S. Pat. No. 6,365,667, issued on Apr. 2, 2002, to Shannon et al., the disclosures of which are herein incorporated by reference to the extent they are non-contradictory herewith.

Permanent wet strength agents including cationic oligomeric or polymeric resins can be used in the present disclosure. Polyamide-polyamine-epichlorohydrin type resins such as KYMENE 557H sold by Hercules, Inc., located at Wilmington, Del. U.S.A., are the most widely used permanent wet-strength agents and are suitable for use in the present disclosure. Such materials have been described in the following U.S. Pat. No. 3,700,623, issued on Oct. 24, 1972, to Keim; U.S. Pat. No. 3,772,076, issued on Nov. 13, 1973, to Keim; U.S. Pat. No. 3,855,158, issued on Dec. 17, 1974, to Petrovich et al.; U.S. Pat. No. 3,899,388, issued on Aug. 12, 1975, to Petrovich et al.; U.S. Pat. No. 4,129,528, issued on Dec. 12, 1978, to Petrovich et al.; U.S. Pat. No. 4,147,586, issued on Apr. 3, 1979, to Petrovich et al.; and U.S. Pat. No. 4,222,921, issued on Sep. 16, 1980, to van Eenam. Other cationic resins include polyethylenimine resins and aminoplast resins obtained by reaction of formaldehyde with melamine or urea. It can be advantageous to use both permanent and temporary wet strength resins in the manufacture of tissue products.

In one embodiment, a relatively large amount of a wet strength agent is incorporated into the nonwoven material. The wet strength agent may also add to the dry strength of the product. In addition, wet strength agents aid in the chemical entangling of the fibers in the material to improve the retention of the conductive fibers. The amount of wet strength agent added to the nonwoven material can depend upon various different factors. In general, for instance, the wet strength agent can be added in an amount from about 1 kg/mton to about 12 kg/mton, such as from about 5 kg/mton to about 10 kg/mton. In certain embodiments, it may be desirable to add as much wet strength agent as possible. In these embodiments, for instance, the wet strength agent can be added in amounts greater than about 7 kg/mton, such as in amounts greater than about 8 kg/mton.

Dry strength agents are well known in the art and include but are not limited to modified starches and other polysaccharides such as cationic, amphoteric, and anionic starches and guar and locust bean gums, modified polyacrylamides, carboxymethylcellulose, sugars, polyvinyl alcohol, chitosans, and the like. Such dry strength agents are typically added to a fiber slurry prior to tissue sheet formation or as part of the creping package.

Additional types of chemicals that may be added to the nonwoven web include, but is not limited to, absorbency aids usually in the form of cationic, anionic, or non-ionic surfactants, humectants and plasticizers such as low molecular weight polyethylene glycols and polyhydroxy compounds such as glycerin and propylene glycol. Materials that supply skin health benefits such as mineral oil, aloe extract, vitamin E, silicone, lotions in general, and the like, may also be incorporated into the finished products.

In general, the products of the present disclosure can be used in conjunction with any known materials and chemicals that are not antagonistic to its intended use. Examples of such materials include but are not limited to baby powder, baking soda, chelating agents, zeolites, perfumes or other odor-masking agents, cyclodextrin compounds, oxidizers, and the like. Of particular advantage, when carbon fibers are used as the conductive fibers, the carbon fibers also serve as odor absorbents. Superabsorbent particles, synthetic fibers, or films may also be employed. Additional options include dyes, optical brighteners, humectants, emollients, and the like.

Nonwoven webs made in accordance with the present disclosure can include a single homogeneous layer of fibers or may include a stratified or layered construction. For instance, the nonwoven web ply may include two or three layers of fibers. Each layer may have a different fiber composition. For example, referring to FIG. 1, one aspect of a device for forming a multi-layered stratified pulp furnish is illustrated. As shown, a three-layered headbox 10 generally includes an upper head box wall 12 and a lower head box wall 14. Headbox 10 further includes a first divider 16 and a second divider 18, which separate three fiber stock layers.

Each of the fiber layers include a dilute aqueous suspension of fibers. The particular fibers contained in each layer generally depends upon the product being formed and the desired results. In one aspect, for instance, middle layer 20 contains pulp fibers in combination with the conductive fibers. Outer layers 22 and 24, on the other hand, can contain only pulp fibers, such as softwood fibers and/or hardwood fibers.

Placing the conductive fibers within the middle layer 20 may provide various advantages and benefits. Placing the conductive fibers in the center of the web, for instance, can produce a conductive material that still has a soft feel on its surfaces. Concentrating the fibers in one of the layers of the web can also improve the conductivity of the material without having to add great amounts of the conductive fibers. In one aspect, for instance, a three-layered web is formed in which each layer accounts for from about 15% to about 40% by weight of the web. The outer layers can be made of only pulp fibers or a combination of pulp fibers and thermoplastic fibers. The middle layer, on the other hand, may contain pulp fibers combined with conductive fibers. The conductive fibers may be contained in the middle layer in an amount from about 30% to about 70% by weight, such as in an amount from about 40% to about 60% by weight, such as in an amount from about 45% to about 55% by weight.

An endless traveling forming fabric 26, suitably supported and driven by rolls 28 and 30, receives the layered papermaking stock issuing from headbox 10. Once retained on fabric 26, the layered fiber suspension passes water through the fabric as shown by the arrows 32. Water removal is achieved by combinations of gravity, centrifugal force and vacuum suction depending on the forming configuration.

Forming multi-layered paper webs is also described and disclosed in U.S. Pat. No. 5,129,988, issued Jul. 14, 1992 to Farrington, Jr., which is incorporated herein by reference.

As described above, in other embodiments, the nonwoven web can comprise a single homogeneous layer of fibers. In producing a homogeneous web, in one embodiment, an aqueous suspension containing pulp fibers and/or synthetic fibers is first produced. The conductive fibers, such as the carbon fibers, are then injected into the aqueous suspension prior to depositing the aqueous suspension onto the forming surface. For example, the conductive fibers can be injected into the aqueous suspension of fibers in a head box just prior to depositing the fibers onto the forming surface. The aqueous suspension of pulp and/or synthetic fibers, for instance, may contain greater than 99% by weight water. For instance, in one embodiment, the aqueous suspension of pulp and/or synthetic fibers contains the fibers in an amount of less than 1% by weight, such as an amount of about 0.5% by weight. The conductive fibers can then be injected into the aqueous suspension at a similar dilution. For instance, aqueous suspension of carbon fibers containing carbon fibers in an amount of about 0.5% by weight may be injected into the aqueous suspension of pulp and/or synthetic fibers.

Injecting the conductive fibers into aqueous suspension of pulp and/or synthetic fibers has been found to reduce the formation of flocks of the conductive fibers. It has been discovered that flocks have a greater tendency to form when the amount of time the fibers are mixed together increases. The creation of flock, for instance, can produce weak spots in the resulting material and cause web breaks in when the nonwoven material is later processed.

Figure 2:
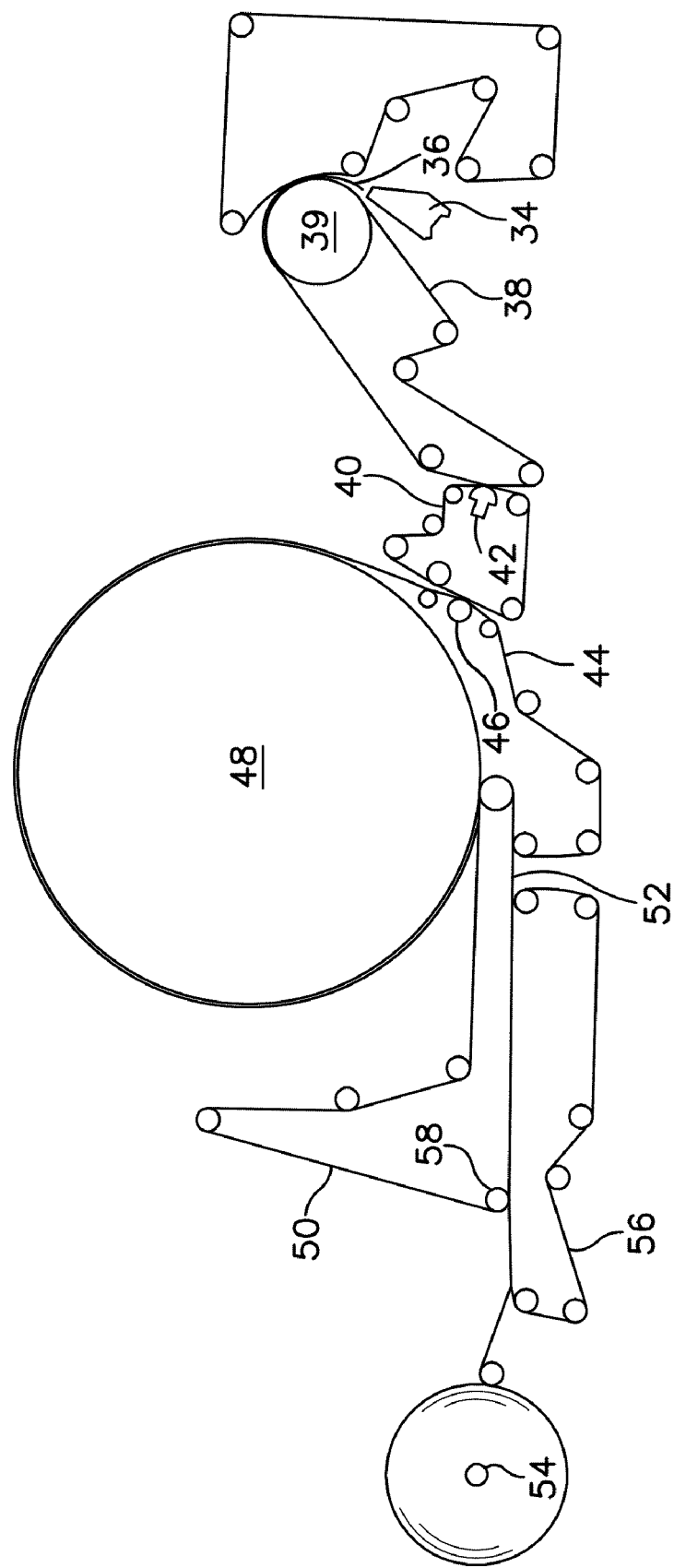
FIG. 2 is a side view of one aspect of a process for forming uncreped through-air dried webs in accordance with the present disclosure.

Once the aqueous suspension of fibers is formed into a nonwoven web, the web may be processed using various techniques and methods. For example, referring to FIG. 2, shown is a method for making uncreped, throughdried tissue sheets. In one aspect, it may be desirable to form the nonwoven web using an uncreped, through-air drying process. It was found that creping the nonwoven web during formation may cause damage to the conductive fibers by destroying the network of conductive fibers within the nonwoven web. Thus, the nonwoven web becomes non-conductive.

For simplicity, the various tensioning rolls schematically used to define the several fabric runs are shown, but not numbered. It will be appreciated that variations from the apparatus and method illustrated in FIG. 2 can be made without departing from the general process. Shown is a twin wire former having a papermaking headbox 34, such as a layered headbox, which injects or deposits a stream 36 of an aqueous suspension of papermaking fibers onto the forming fabric 38 positioned on a forming roll 39. The forming fabric serves to support and carry the newly-formed wet web downstream in the process as the web is partially dewatered to a consistency of about 10 dry weight percent. Additional dewatering of the wet web can be carried out, such as by vacuum suction, while the wet web is supported by the forming fabric.

The wet web is then transferred from the forming fabric to a transfer fabric 40. In one optional aspect, the transfer fabric can be traveling at a slower speed than the forming fabric in order to impart increased stretch into the web. This is commonly referred to as a "rush" transfer. The relative speed difference between the two fabrics can be from 0-15 percent, more specifically from about 0-8 percent. Transfer is preferably carried out with the assistance of a vacuum shoe 42 such that the forming fabric and the transfer fabric simultaneously converge and diverge at the leading edge of the vacuum slot.

The web is then transferred from the transfer fabric to the throughdrying fabric 44 with the aid of a vacuum transfer roll 46 or a vacuum transfer shoe, optionally again using a fixed gap transfer as previously described. The throughdrying fabric can be traveling at about the same speed or a different speed relative to the transfer fabric. If desired, the throughdrying fabric can be run at a slower speed to further enhance stretch. Transfer can be carried out with vacuum assistance to ensure deformation of the sheet to conform to the throughdrying fabric, thus yielding desired bulk and appearance if desired. Suitable throughdrying fabrics are described in U.S. Pat. No. 5,429,686 issued Jul. 4, 1995 to Kai F. Chiu et al. and U.S. Pat. No. 5,672,248, issued Sep. 30, 1997 to Wendt, et al. which are incorporated by reference.

In one aspect, the throughdrying fabric provides a relatively smooth surface. Alternatively, the fabric can contain high and long impression knuckles.

The side of the web contacting the throughdrying fabric is typically referred to as the "fabric side" of the nonwoven web. The fabric side of the web, as described above, may have a shape that conforms to the surface of the throughdrying fabric after the fabric is dried in the throughdryer. The opposite side of the paper web, on the other hand, is typically referred to as the "air side". The air side of the web is typically smoother than the fabric side during normal throughdrying processes.

The level of vacuum used for the web transfers can be from about 3 to about 15 inches of mercury (75 to about 380 millimeters of mercury), preferably about 5 inches (125 millimeters) of mercury. The vacuum shoe (negative pressure) can be supplemented or replaced by the use of positive pressure from the opposite side of the web to blow the web onto the next fabric in addition to or as a replacement for sucking it onto the next fabric with vacuum. Also, a vacuum roll or rolls can be used to replace the vacuum shoe(s).

While supported by the throughdrying fabric, the web is finally dried to a consistency of about 94 percent or greater by the throughdryer 48 and thereafter transferred to a carrier fabric 50. The dried basesheet 52 is transported to the reel 54 using carrier fabric 50 and an optional carrier fabric 56. An optional pressurized turning roll 58 can be used to facilitate transfer of the web from carrier fabric 50 to fabric 56. Suitable carrier fabrics for this purpose are Albany International 84M or 94M and Asten 959 or 937, all of which are relatively smooth fabrics having a fine pattern. Although not shown, reel calendering or subsequent off-line calendering can be used to improve the smoothness and softness of the basesheet. Calendering the web may also cause the conductive fibers to orient in a certain plane or in a certain direction. For instance, in one aspect, the web can be calendered in order to cause primarily all of the conductive fibers to lie in the X-Y plane and not in the Z direction. In this manner, the conductivity of the web can be improved while also improving the softness of the web.

In one aspect, the nonwoven web 52 is a web which has been dried in a flat state. For instance, the web can be formed while the web is on a smooth throughdrying fabric. Processes for producing uncreped throughdried fabrics are, for instance, disclosed in U.S. Pat. No. 5,672,248, Jul. 14, 1992 to Wendt, et al.; U.S. Pat. No. 5,656,132, issued Aug. 12, 1997 to Farrington, et al.; U.S. Pat. No. 6,120,642, issued Sep. 19, 2000 to Lindsay and Burazin; U.S. Pat. No. 6,096,169, issued Aug. 1, 2000 to Hermans, et al.; U.S. Pat. No. 6,197,154, issued Mar. 6, 2001 to Chen, et al.; and U.S. Pat. No. 6,143,135, issued Nov. 7, 2000 to Hada, et al., all of which are herein incorporated by reference in their entireties.

In FIG. 2, a process is shown for producing uncreped through-air dried webs. It should be understood, however, that any suitable process or technique that does not use creping may be used to form the conductive nonwoven web.

Figure 19:
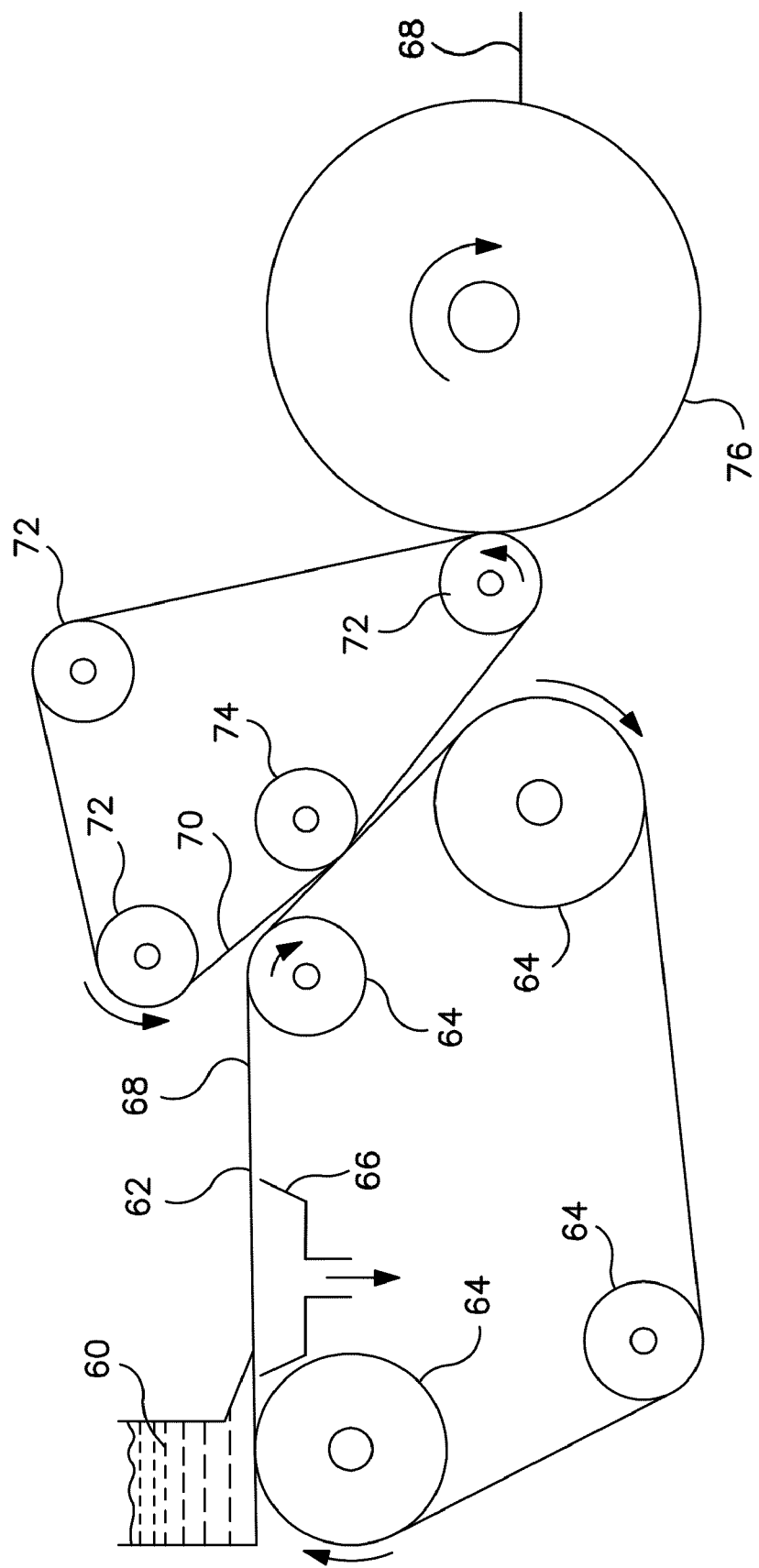
FIG. 19 is a side view of another aspect of a process for forming conductive nonwoven webs in accordance with the present disclosure; and Repeat use of reference characters in the present specification and drawings is intended to represent the same or analogous features or elements of the present disclosure. The drawings are representational and are not necessarily drawn to scale. Certain proportions thereof may be exaggerated, while others may be minimized.

For example, referring to FIG. 19, another process that may be used to form nonwoven webs in accordance with the present disclosure is shown. In the embodiment illustrated in FIG. 19, the newly formed web is wet pressed during the process.

In this embodiment, a headbox 60 emits an aqueous suspension of fibers onto a forming fabric 62 which is supported and driven by a plurality of guide rolls 64. The headbox 60 may be similar to the headbox 34 shown in FIG. 1. In addition, the aqueous suspension of fibers may contain conductive fibers as described above. A vacuum box 66 is disposed beneath forming fabric 62 and is adapted to remove water from the fiber furnish to assist in forming a web. From forming fabric 62, a formed web 68 is transferred to a second fabric 70, which may be either a wire or a felt. Fabric 70 is supported for movement around a continuous path by a plurality of guide rolls 72. Also included is a pick up roll 74 designed to facilitate transfer of web 68 from fabric 62 to fabric 70.

From fabric 70, web 68, in this embodiment, is transferred to the surface of a rotatable heated dryer drum 76, such as a Yankee dryer. As shown, as web 68 is carried through a portion of the rotational path of the dryer surface, heat is imparted to the web causing most of the moisture contained within the web to be evaporated. The web 68 is then removed from the dryer drum 76 without creping the web.

In order to remove the web 68 from the dryer drum 76, in one embodiment, a release agent may be applied to the surface of the dryer drum or to the side of the web that contacts the dryer drum. In general, any suitable release agent may be used that facilitates removal of the web from the drum so as to avoid the necessity of creping the web.

Release agents that may be used include, for instance, polyamidoamine epichlorohydrin polymers, such as those sold under the trade name REZOSOL by the Hercules Chemical Company. Particular release agents that may be used in the present disclosure include Release Agent 247, Rezosol 1095, Crepetrol 874, Rezosol 974, ProSoft TQ-1003 all available from the Hercules Chemical Company, Busperse 2032, Busperse 2098, Busperse 2091, Buckman 699 all available from Buckman Laboratories, and 640C release, 640D release, 64575 release, DVP4V005 release, DVP4V008 release all available from Nalco.

During the process of making the nonwoven material, such as either shown in FIG. 2 or FIG. 19, the web can be flattened and densified. One technique for flattening or densifying the web is by feeding the web through the nip of opposing calender rolls. Flattening and densifying the sheet has been found to reduce fallout of the carbon fiber during further processing. Flattening the web reduces the overall caliper or thickness and increases the electrical conductivity of the material by increasing the conductive fiber network and uniformity. Reducing the thickness of the material may also increase the run time of material rolls during product processing which improves efficiency, waste and delay. Increased conductivity may allow for an overall reduction in conductive fiber contained in the finished material.

When calendering the web, the web can be calendered in a dry state or in a wet state. In one embodiment, for instance, the calender rolls may apply a pressure of at least 900 PLI, such as from about 900 PLI to about 1100 PLI. For instance, in one particular embodiment, the pressure applied by the calendering rolls may be from about 950 PLI to about 1000 PLI, such as a pressure of about 980 PLI.

Figure 6:
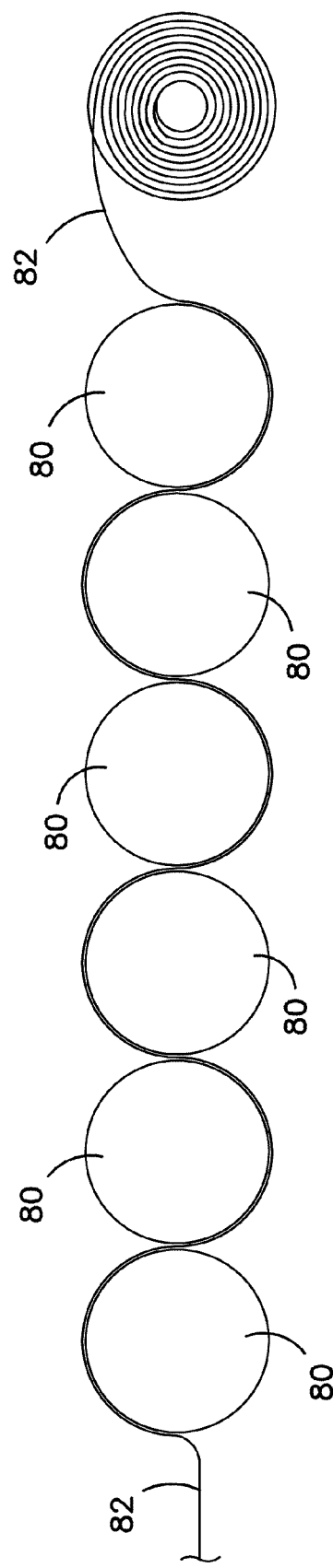

In an alternative embodiment, as shown in FIG. 6, the web can be pressed against a plurality of drying cylinders that not only dry the web but flatten and densify the web. For example, referring to FIG. 6, a plurality of consecutive drying cylinders 80 are shown. In this embodiment, six consecutive drying cylinders are illustrated. It should be understood, however, that in other embodiments more or less drying cylinders may be used. For example, in one embodiment, eight to twelve consecutive drying cylinders may be incorporated into the process.

As shown, a wet web 82 formed according to any suitable process is pressed into engagement with the first drying cylinder 80. For example, in one embodiment, a fabric or suitable conveyor may be used to press the web against the surface of the drying cylinder. The web is wrapped around the drying cylinder at least about 150°, such as at least about 180° prior to being pressed into engagement with the second drying cylinder. Each of the drying cylinders can be heated to an optimized temperature for drying the web during the process.

The nonwoven web can be coated one-side or both sides with additives, such as latex or starch to increase tensile strength or to create other functionalities, such as serving as an insulation layer.

Nonwoven webs made in accordance with the present disclosure can have various different properties and characteristics depending upon the application in which the webs are to be used and the desired results. For instance, the nonwoven web can have a basis weight of from about 15 gsm to about 200 gsm or greater. For instance, the basis weight of the nonwoven web can be from about 15 gsm to about 110 gsm, such as from about 15 gsm to about 50 gsm.

If desired, the nonwoven web can be made with a relatively high bulk or relatively low bulk. For instance, the bulk can be from about 2 cc/g to about 20 cc/g, such as from about 3 cc/g to about 10 cc/g.

When producing nonwoven webs having a relatively low bulk, the bulk can be generally less than about 2 cc/g, such as less than about 1 cc/g, such as less than 0.5 cc/g.

The sheet "bulk" is calculated as the quotient of the caliper of a dry tissue sheet, expressed in microns, divided by the dry basis weight, expressed in grams per square meter. The resulting sheet bulk is expressed in cubic centimeters per gram. More specifically, the caliper is measured as the total thickness of a stack of ten representative sheets and dividing the total thickness of the stack by ten, where each sheet within the stack is placed with the same side up. Caliper is measured in accordance with TAPPI test method T411 om-89 "Thickness (caliper) of Paper, Paperboard, and Combined Board" with Note 3 for stacked sheets. The micrometer used for carrying out T411 om-89 is an Emveco 200-A Tissue Caliper Tester available from Emveco, Inc., located at Newberg, Oreg. U.S.A. The micrometer has a load of 2.00 kilo-Pascals (132 grams per square inch), a pressure foot area of 2500 square millimeters, a pressure foot diameter of 56.42 millimeters, a dwell time of 3 seconds and a lowering rate of 0.8 millimeters per second.

Nonwoven webs made in accordance with the present disclosure can also have sufficient strength so as to facilitate handling. For instance, in one embodiment, the webs can have a strength (or peak load) of greater than about 5000 grams force in the machine or length direction, such as greater than about 5500 grams force, such as even greater than about 6000 grams force. Tensile testing of the nonwoven material, for instance, can be conducted on a one inch wide specimen at 300 mm/min and 75 mm gage length.

The conductivity of the nonwoven web can also vary depending upon the type of conductive fibers incorporated into the web, the amount of conductive fibers incorporated into the web, and the manner in which the conductive fibers are positioned, concentrated or oriented in the web. In one aspect, for instance, the nonwoven web can have a resistance of less than about 1500 Ohms/square, such as less than about 100 Ohms/square, such as less than about 10 Ohms/square.

The conductivity of the sheet is calculated as the quotient of the resistant measurement of a sheet, expressed in Ohms, divided by the ratio of the length to the width of the sheet. The resulting resistance of the sheet is expressed in Ohms per square. More specifically, the resistance measurement is in accordance with ASTM F1896-98 "Test Method for Determining the Electrical Resistivity of a Printed Conductive Material". The resistance measuring device (or Ohm meter) used for carrying out ASTM F1896-98 is a Fluke multimeter (model 189) equipped with Fluke alligator clips (model AC120); both are available from Fluke Corporation, located at Everett, Wash. U.S.A.

The resulting conductive web made in accordance with the present disclosure may be used alone as a single ply product or can be combined with other webs to form a multi-ply product. In one aspect, the conductive nonwoven web may be combined with other tissue webs to form a 2-ply product or a 3-ply product. The other tissue webs, for instance, may be made entirely from pulp fibers and can be made according to any of the processes described above.

In an alternative aspect, the conductive nonwoven web made according to the present disclosure may be laminated using an adhesive or otherwise to other nonwoven or polymeric film materials. For instance, in one aspect, the conductive nonwoven web may be laminated to a meltblown web and/or a spunbond web that are made from polymeric fibers, such as polypropylene fibers. As described above, in one aspect, the conductive nonwoven web can contain synthetic fibers. In this aspect, the nonwoven web may be bonded to an opposing web containing synthetic fibers such as a meltblown web or spunbond web.

Incorporating the conductive nonwoven web into a multi-ply product may provide various advantages and benefits. For instance, the resulting multi-ply product may have better strength, may be softer, and/or may have better liquid wicking properties.

In addition to wet laid webs, nonwoven materials made according to the present disclosure can be produced using various other techniques and processes. For instance, in an alternative embodiment, the nonwoven material can be formed according to a hydroentangling process. A hydroentangling process utilizes high pressure jet streams of water to entangle fibers and/or filaments to form a highly entangled consolidated fibrous structure. In particular, the conductive fibers and/or pulp fibers can be combined with a preformed nonwoven web using the jet streams of water. The preformed web may comprise, for instance, a spunbond web made from synthetic fibers.

Hydroentangled nonwoven fabrics are disclosed, for example, in U.S. Pat. No. 3,494,821 to Evans and U.S. Pat. No. 4,144,370 to Bouolton, which are both incorporated herein by reference. Hydroentangled composite nonwoven fabrics are also disclosed in U.S. Pat. No. 5,284,703 to Everhart and U.S. Pat. No. 6,315,864 to Anderson, which are also both incorporated herein by reference.

In an alternative embodiment, a coform process may be used to produce the conductive nonwoven web. A coform web generally refers to composite materials comprising a mixture or stabilized matrix of thermoplastic fibers and a second non-thermoplastic material. For instance, coform materials may be made by a process in which at least one melt blown die head is arranged near a chute through which other materials are added to the web while it is forming. The other materials may include the conductive fibers alone or in combination with other fibers. Other fibers that may be combined with the conductive fibers include, for instance, pulp fibers, cotton fibers, rayon fibers, synthetic staple fibers, and the like. Some examples of coform materials are described in U.S. Pat. No. 4,100,324 to Anderson; U.S. Pat. No. 5,284,703 to Everhart and U.S. Pat. No. 5,350,624 to Georger, which are all incorporated herein by reference.

Webs produced by the coform process are generally referred to as coform materials. More particularly, one process for producing coform nonwoven webs involves extruding a molten polymeric material through a die head into fine streams and attenuating the streams by converging flows of high velocity, heated gas supplied from nozzles to break the polymer streams into discontinuous micro fibers of small diameter. The die head, for instance, can include at least one straight row of extrusion apertures. In general the micro fibers may have an average fiber diameter of up to about 10 microns. The average diameter of the micro fibers can be generally greater than about 1 micron, such as from about 2 microns to about 5 microns. While the micro fibers are predominately discontinuous, they generally have a length exceeding that normally associated with staple fibers.

In order to combine the molten polymer fibers with another material, such as conductive fibers and/or pulp fibers, a primary gas stream is merged with a secondary gas stream containing the individualized conductive fibers. Thus, the conductive fibers become integrated with the polymer fibers in a single step. The integrated air stream is then directed onto a forming surface to form the nonwoven fabric. If desired, the fabric may be passed into the nip of a pair of vacuum rolls in order to further integrate the two different materials.

When forming the coform web, the conductive fibers and/or other fibers may be present in the coform material and in an amount from about 10% of weight to about 80% by weight, such as from about 30% by weight to about 70% by weight.

In one aspect, the conductive fibers may be contained within the nonwoven web so as to form distinct zones of conductivity. For instance, in one aspect, a head box may be used instead of or in addition to separating the fibers vertically. As shown in FIG. 1, the head box may be designed to also separate the fibers horizontally. In this manner, conductive fibers may only be contained in certain zones along the length (machine direction) of the web. The conductive zones may be separated by non-conductive zones that only contain non-conductive materials such as pulp fibers.

In accordance with the present disclosure, once the conductive nonwoven material is formed, non-conductive zones are created in the material by subjecting the material to ultrasonic energy. Subjecting the material to ultrasonic energy, in addition to forming non-conductive zones, can also form bond lines depending upon various factors, including the make up of the nonwoven material and the amount of ultrasonic energy that the material is subjected to.

Figure 3:
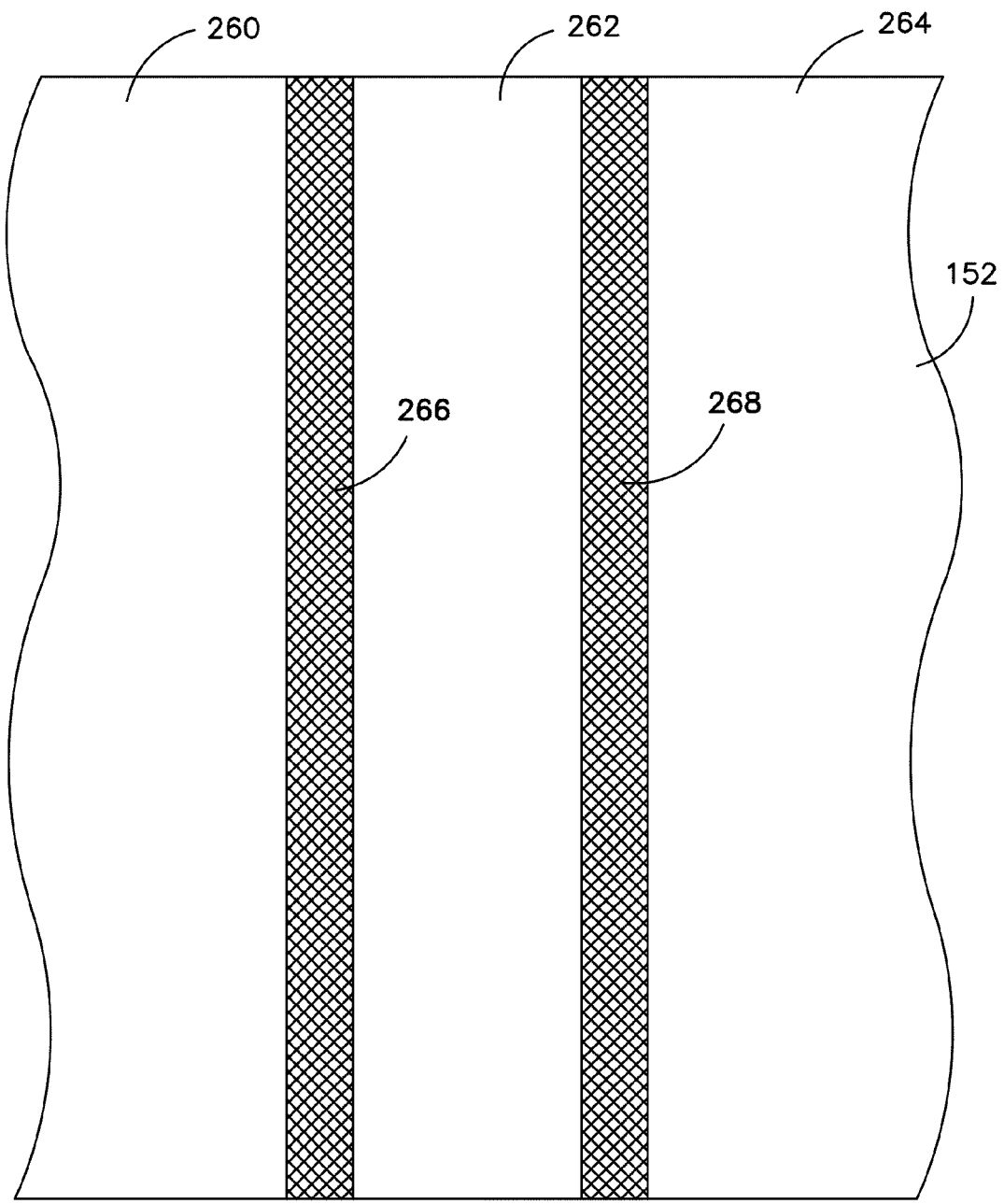
FIG. 3 is a cutaway plan view of one aspect of a conductive nonwoven web made in accordance with the present disclosure including different zones of conduction.

For instance, as shown in FIG. 3, a conductive nonwoven web 152 made in accordance with the present disclosure is shown. In this aspect, non-conductive zones or bond lines 266 and 268 have been formed into the web in the length direction. The bond lines 266 and 268 are be formed using ultrasonic bonding. Forming the bond lines into the nonwoven web create areas where the conductive fibers can no longer network for carrying an electric current. Thus, the bond lines form nonconductive zones within the base web. As shown in FIG. 3, the bond lines 266 and 268 can thus form distinct conductive zones 260, 262 and 264.

A product made in accordance with the disclosed technology can be used to create a flexible circuit through processing and additives techniques. The flexible circuit allows for entry into the growing market of printed electronics that may or may not be disposable. Traditional flexible electronics use metal or carbon inks to create conductive traces in a printed circuit. The metal inks are very expensive, require special handling, and often require adjustments to the printers to accommodate. Additionally, there are concerns with throughput and cost as to whether or not printed electronic executions will ever be truly cost effective enough to be considered disposable. The disclosed technology provides a distinct advantage of being cost effective and easier to handle when compared to current flexible electronics technology. The final product of this process creates a web with conductive routings that can be adhered or applied to rigid substrates and have printed or composite electrical components connected to create a functional cost effective disposable electrical circuit.

For creation of a circuit from the conductive web, it is essential to break, remove or alter some of the carbon to carbon fiber bonds and create areas of higher resistance in the conductive web. This can be accomplished by ultrasonic or pressure bonds applied to the web during processing. The bonding techniques are well known in the industry and can be configured in a multitude of patterns to create specific avenues of greater or lesser resistance that define a circuit. This circuit path can be processed at high speeds and efficiencies making it possible to produce low cost disposable circuits in a variety of health and hygiene products or other consumer products. The width of the bond as well as the pressure or intensity of the bond when applied can determine the extent of the resistance increase. Areas that are not affected by the bonding process are left at the same conductive level. This type of processing can easily be adapted for current industry use to create high throughput circuits incorporated into nonwoven materials.

In one embodiment, for instance, an ultrasonic rotary bonder may be used to form the non-conductive areas within the nonwoven material. The rotary bonder can include, for instance, a power supply connected to a converter that converts high frequency electrical energy to high frequency mechanical energy. The converter can be connected to a booster that modifies the amplitude of the mechanical energy. The booster is then in communication with a rotary horn that fine tunes the amplitude and applies it to the nonwoven material. In one embodiment, the ultrasonic device may operate at a frequency from about 20 kHz to about 40 kHz.

The ultrasonic energy applied to the nonwoven material shatters the conductive fibers creating electrical discontinuities. For example, the resistance within the non-conductive zones may be four times greater than the resistance of the conductive zones. For instance, the resistance may be five times greater, six times greater, or even up to ten times greater or more than the resistance in the conductive zones.

Of particular advantage, the ultrasonic device is capable of creating a pattern within the nonwoven material. The pattern is formed of the non-conductive zones and can be used to design or create circuit patterns or connections within a single ply or between multiple plies of material.

The non-conductive zones formed into the conductive nonwoven material can vary depending upon the particular application and desired results. In one embodiment, for instance, a flat pattern can be formed into the nonwoven web. Alternatively, a discontinuous dot pattern may be used.

The ultrasonic energy has different effects on the materials contained within the nonwoven web. As described above, for instance, the ultrasonic energy is known to break and shatter carbon fibers. Cellulose fibers subjected to the ultrasonic energy, however, tend to flatten and can increase in hydrogen bonding within the non-conductive zones. Synthetic fibers, on the other hand, can melt and bond to other substrates when subjected to ultrasonic energy.

In one embodiment, when the nonwoven conductive web comprises a paper web containing significant amounts of pulp fibers, the nonwoven web can be combined with other webs in order to increase the strength of the overall material. For instance, in one embodiment, the conductive web can be laminated to a synthetic web, such as a meltblown web, a spunbond web, or the like. The two layers, for instance, can be attached together using the ultrasonic energy. In this manner, the ultrasonic energy not only forms the non-conductive zones in the conductive web but also serves to bond the two webs together.

In an alternative embodiment, the conductive nonwoven web may comprise a web that contains significant amounts of synthetic fibers. The web may comprise, for instance, a hydroentangled web, a coform web, or a wet laid web made with staple thermoplastic fibers. In some applications, it may be desirable to use multiple conductive webs attached together. Ultrasonic energy can be used to form non-conductive zones within each of the webs. In addition, the ultrasonic energy can be used to bond the webs together. In one particular application, for instance, ultrasonic energy can be used to simultaneously form non-conductive zones in two opposing conductive webs and to bond the webs together where the non-conductive zones are formed. In one embodiment, an electrical connection can be made between the two webs during the process. For instance, the webs may become electrically connected together adjacent the non-conductive zones where fiber entangling may occur. In fact, while being subjected to ultrasonic energy, the conductive fibers within each web may migrate to the surface of the web. In this manner, the conductive fibers can form fiber to fiber connections between the two layers at areas adjacent to non-conductive zones where the fibers have been disintegrated or otherwise shattered.

In one embodiment, ultrasonic energy can also be used to connect two webs together and create an electrical connection between the webs without creating non-conductive zones. In this embodiment, for instance, the webs may be subjected to lower amounts of energy that prevent the conductive fibers from breaking up and forming an electrical discontinuity within the web.

In addition to the use of ultrasonic energy, various other methods are available for forming non-conductive zones. Such other techniques and methods may be used in conjunction with the use of ultrasonic energy. For example, other methods to create circuit paths include mechanical methods such as flex knife and die cutting the conductive tissue or material to sever or remove the conductive tissue in areas that high resistance is required. This is essentially cutting out a circuit pattern using standard process technologies. The mechanical cutting, pressure bonding and ultrasonic bonding techniques can all be used together to most efficiently produce the circuit pattern and can be done using rotary or plunge mechanical technologies. Further, another method can include slot coating the conductive tissue while over a heated roll. The heat draws the polymer into the conductive web towards the roll much like solder is drawn into a sweated pipe joint. Other options are to surface coat the polymer on the web or to use many other hot melt coating techniques used by those skilled in the art. A heated nip can also be used if needed. Optimum coating techniques are dependant on polymer selection and various process speeds and restrictions.

Once a conductive nonwoven web is formed and processed so as to include non-conductive zones, the product can be used in numerous electronic devices.

For example, in one embodiment of the present disclosure, an electronic switch, such as a membrane switch may be constructed. Switches are one of the most prevalent electrical components in consumer products requiring a button or keypad interface (i.e., keyboard, cell phones, etc.). As this technology moves to wearable computing platforms, or applications requiring a smart interface (i.e., packaging, advertising, and promotion), it will be advantageous to create a means to reduce the manufacturing time and cost of these switches. Because robust substrates are required as a foundation for the printed conductors (i.e. plastics), and the cost of conductive inks is relatively high, many applications lie on the edge of disposable and semi-durable. A conductive web made with at least 5% carbon fiber has proven to be a low cost alternative conductive material that requires less handling to create the circuit patterns necessary for a functional membrane switch, leading to a fully disposable product.

Current membrane switch technology uses a five layer system; an outer sealing layer, conductor, dielectric, conductor, and outer layer. In a similar fashion, the conductive web can be used, but in a five or three layer system. The five layer system requires a more robust switch but with the three layer system the paper can act as the two outer layers as well as the conductors, separated by a single dielectric.

Figure 15A:
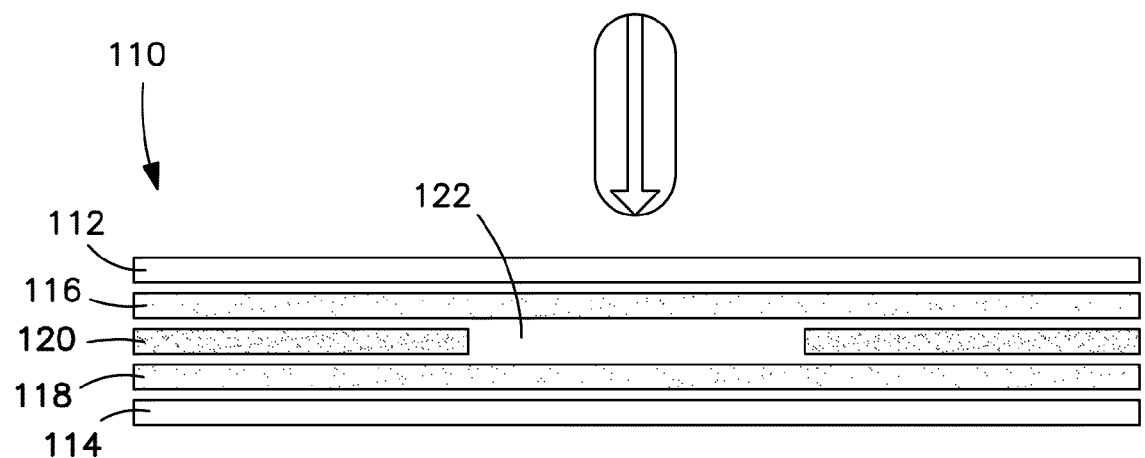

Referring to FIG. 15A, for instance, one embodiment of a five layer switch 110 made in accordance with the present disclosure is shown. As illustrated, the switch 110 includes two outer protective layers, namely an outer cover layer 112 and a backing layer 114. In between the outer cover layer 112 and the backing layer 114 are a pair of opposing conductive layers 116 and 118. Both of the conductive layers can comprise nonwoven conductive webs made in accordance with the present disclosure. In between the conductive layers 116 and 118 is a non-conductive layer 120 that can be comprised of a dielectric material. As shown, the non-conductive layer 120 includes an aperture 122. In this manner, when pressure is applied to the outer cover 112 of the switch 110, the first conductive layer 116 contacts the second conductive layer 118 making an electrical connection between the two layers.

In accordance with the present disclosure, the conductive non-woven materials 116 and/or 118 can further include non-conductive zones created by subjecting the conductive layers to ultrasonic energy. The non-conductive zones can be used to channel the electrical energy to a particular location. For instance, the non-conductive zones may be used to form a circuit for attaching the switch to an electronic device that is activated when pressure is applied to the switch.

Figure 15B:
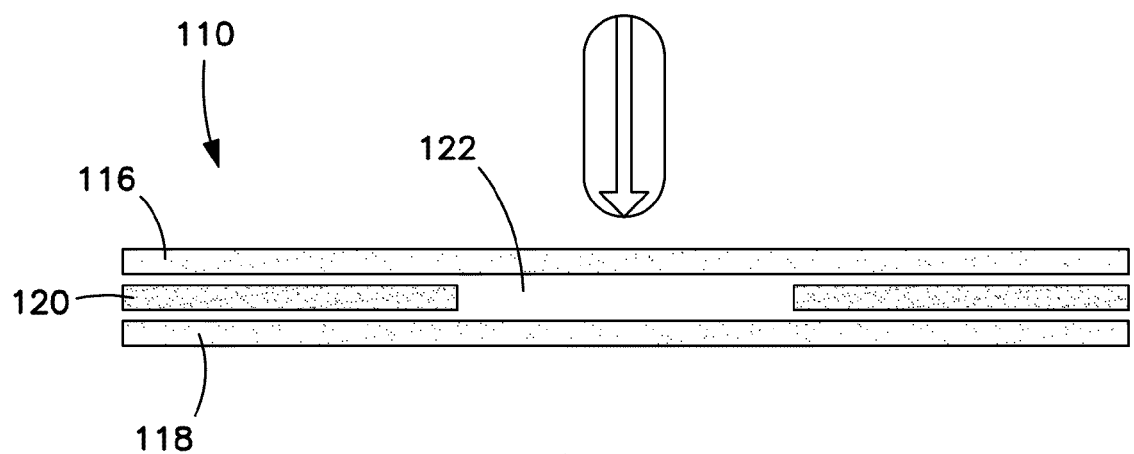

Referring to FIG. 15B, a three layer switch 110 made in accordance with the present disclosure is shown. Like reference numerals have been used to indicate similar elements. As shown, in this embodiment, the switch 110 includes two opposing conductive layers 116 and 118 separated by a non-conductive layer 120 that defines an aperture 12. In the embodiment illustrated in FIG. 15B, the conductive webs 116 and 118 not only serve to make an electrical connection when the switch is activated, but also serve as the outer cover layers. In one embodiment, for instance, graphics or printed matter can be applied directly to one or both of the conductive nonwoven webs. In this manner, a relatively inexpensive switch can be produced for use in conjunction with numerous electronic devices.

Figure 16:
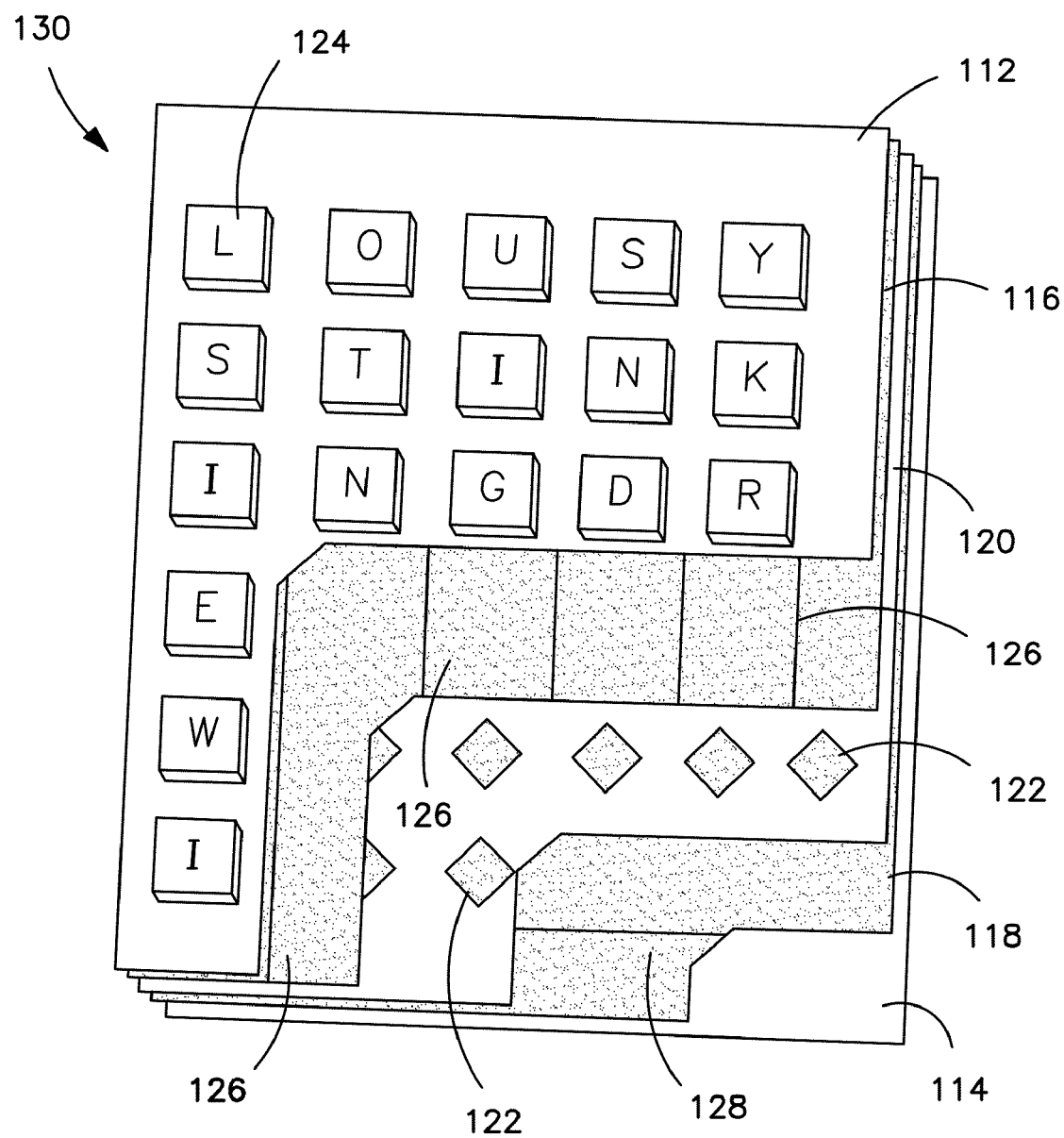
Figure 17:
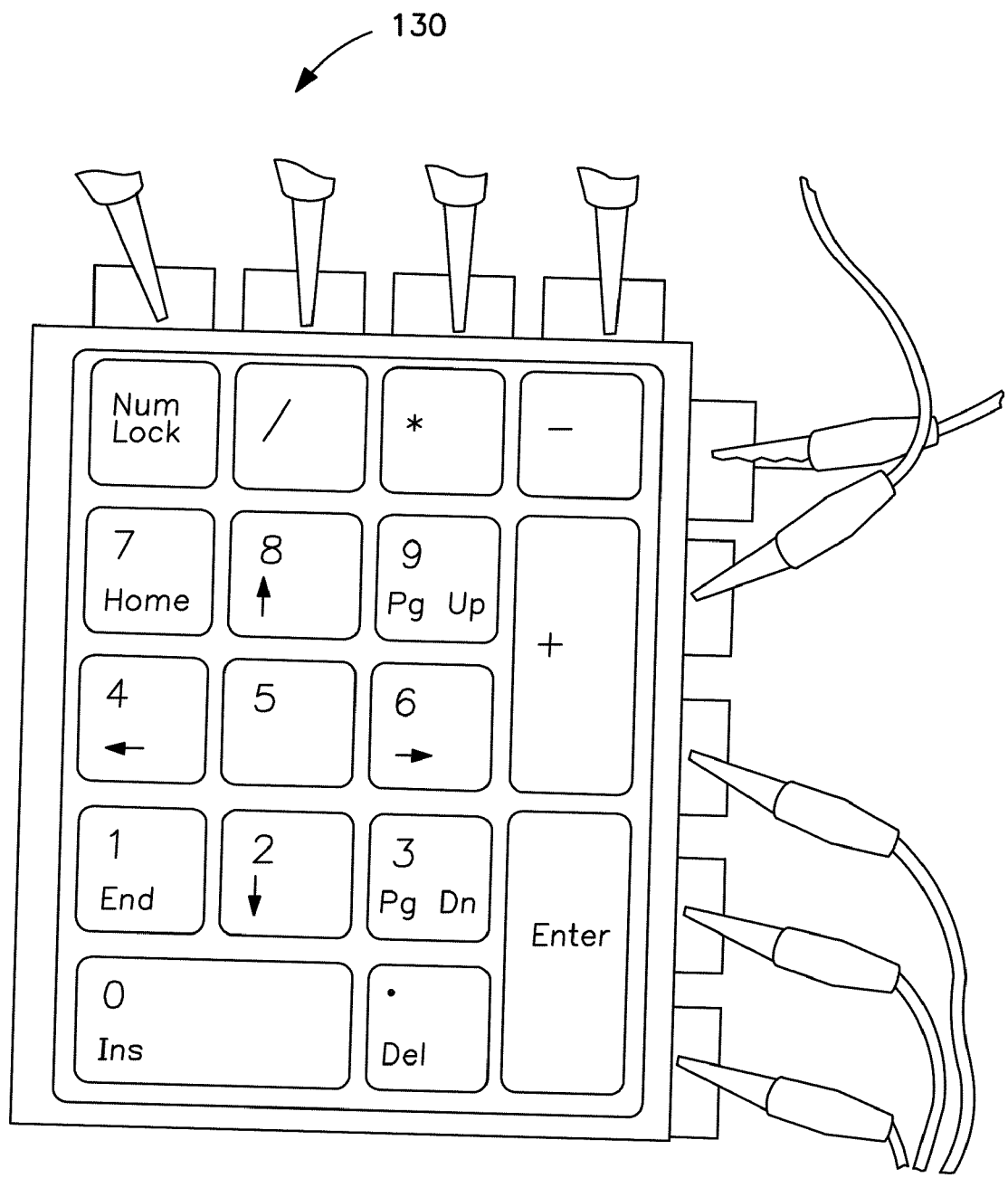
Figure 18:
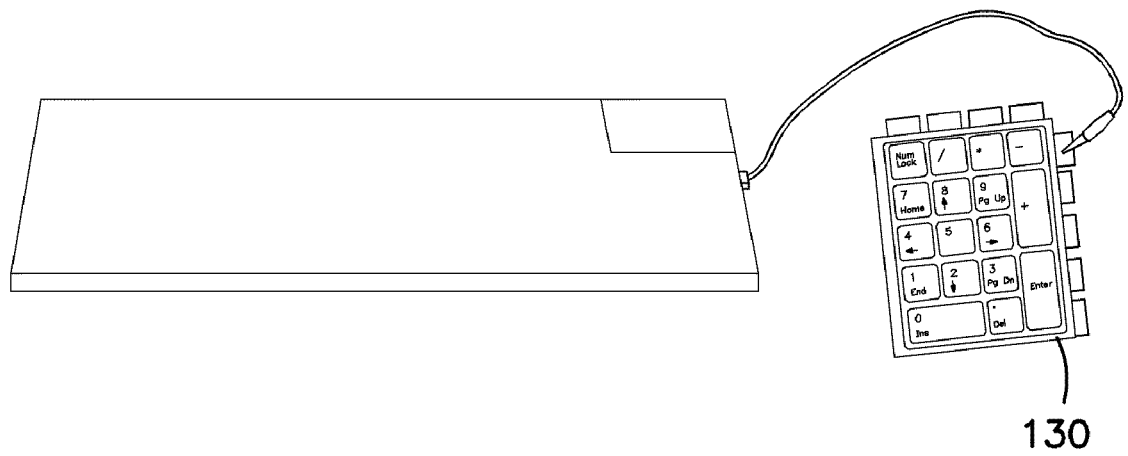

Referring now to FIGS. 16, 17 and 18, one embodiment of the keyboard 130 that also may be constructed in accordance with the present disclosure is shown. The keyboard (or keypad) 130 can be constructed similar to the switch 10 shown in FIGS. 15A and 15B. In this regard, like reference numerals have been used to indicate similar elements.

In FIG. 16, for instance, a five-layer keyboard 130 is illustrated. The keyboard 130 includes two layers of conductive non-woven webs 116 and 118 made in accordance with the present disclosure separated by a non-conductive layer 120 that may be made from a dielectric material. The non-conductive layer 120 includes a plurality of apertures 122 that correspond in locations to the plurality of keys 124 that appear on an outer cover 112 of the keyboard 130.

As shown, each conductive nonwoven material further includes a plurality of non-conductive zones that allow for a formation of electrical pathways when the different keys are depressed. For example, the conductive nonwoven web 116 includes a plurality of vertical non-conductive zones 126 that may be formed using ultrasonic energy. Similarly, the nonwoven conductive web 118 includes a plurality of horizontal non-conductive zones 128. In this manner, when one of the keys 124 is pressed an electrical connection is made between the two conductive webs, the non-conductive zones allow for two different electrical pathways to become activated for identifying the key that was pressed.

In FIG. 17, a prototype of a disposable keypad 130 is shown, with the two separate layers of conductive web protruding on the right side and top of the keypad. FIG. 18, shows the disposable keypad 130 connected to a pre-existing keyboard circuit.

Keyboards and mice continue to be one aspect of a sterile operating room that contributes to infections. An antibacterial disposable keyboard/keypad for use in hospitals would reduce the possibility of hospital acquired infections. Current designs for keyboards all require robust electronics to control the function of each button of the user interface; however, by using conductive web to replace the electronics, the cost is lowered to a point of disposability.

For further exemplary purposes, disposable switches can be used to create disposable gowns with a user interface. Any disposable gown (surgical, clean room, hazardous work, etc.) can include switches using the conductive web to create functions useful to the wearer. For instance, a surgical gown can include symbols of tools used during a medical procedure. The switch interface can be used to indicate when the device is used and whether or not it has been removed from the patient. Output of the device can be to a wired or wireless device that indicates status on a display.

Wherein an electronic device made in accordance with the present disclosure is incorporated into an article of clothing, the conductive nonwoven material may be attached to the article of clothing or may be incorporated directly into the article of clothing. For instance, in one embodiment, the conductive web itself may be used to construct the article of clothing and ultrasonically treated areas can be used to form an electric circuit within the clothing for any desired purpose. In one particular application, for instance, the article of clothing may comprise an absorbent article, such as a diaper or training pants that includes a wetness sensing device.

For further exemplary purposes, a product made in accordance with the disclosed technology can be a heating element made for use as a portable device for therapeutic heating and other low cost heating applications. Heat therapy reduces pain, especially the pain of muscle tension or spasm. Further, patients with other types of pain can benefit. Heat therapy acts to: (1) Increase the blood flow to the skin. (2) Dilate blood vessels, increasing oxygen and nutrient delivery to local tissues. (3) Decrease joint stiffness by increasing muscle elasticity. The portable device includes a disposable heating element, a re-useable battery operated control unit, and a mechanical and electrical means to connect the disposable heating pad to the unit.

In designing heating products in accordance with the present disclosure, ultrasonic energy can be used not only to form and shape the heating elements with the proper resistance, but can also be used to create and produce circuitry that electrically connects the heating elements to a power source.

Constructing the heating element using the disclosed technology of a conductive web made with at least about 5% carbon fiber, such as at least about 20% carbon fiber, provides many advantages over current commercially available products which use exothermic chemical reactions. The advantages of the portable heating device of the present invention are: (1) Disposable heating elements can be made inexpensively using the disclosed technology, compared to the chemically activated products. (2) Adjustable control to regulate the amount of heat. (3) Battery can be re-chargeable or replaceable. (4) Reflective material on the side opposite to the body increases thermal efficiency. (5) A fuse link protects wearer from overheating.

Additionally, using conductive nonwoven heating elements and laminated with polyfilms and nonwoven materials make a portable heating device inexpensive and easily customized for various sizes and shapes. This can be used for heat therapy or it can be used to provide heat in adverse or cold weather conditions to humans or animals. Such tailor made products can be designed to fit arms, legs, torsos, necks, blankets and can even be used for animals such as horses, cattle, rabbits, various reptiles, dogs and cats. This technology can be used in extreme environments such as dry suits for divers, rescue suits for marine accidents or other conditions of extreme cold such as an automobile trouble in extreme cold environments. This concept can even be used as a disposable heated bath towel for home, health care or hotel uses. This technology can be used for disposable heating liners for coats, ski suits or other clothing. The conductive nonwoven heater can be constructed of several layers of conductive paper to build a heater with lower overall resistance and higher thermal mass. Additionally, another low cost heating application for warming common items such as beverage containers is valid. A user can clip on the semi-durable or reusable power pack to any of these embodiments and use the product.

The battery ideally is rechargeable due to the high current draw required to power the heating element. A basic review of power equations dictates the current, voltage, and resistance requirements to optimize the functionality of the heating element. An ideal application of the battery has a minimum of any expensive small connectors that can require more handling during manufacturing. Instead, it is recommended to use a rechargeable battery pack that is wrapped in a conductive hook material where the heating element has the opposite loop material. The larger surface area of the conductive hook and loop ensures a lower connection resistance for the power supply to the heating element.

Figure 14A:
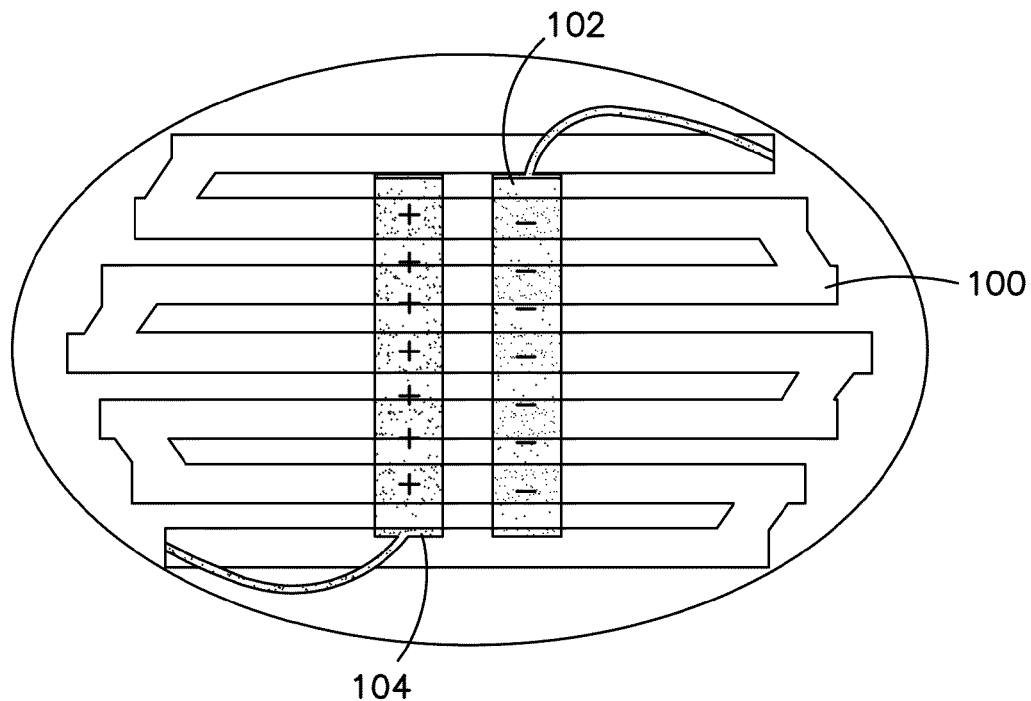

In FIGS. 14A and B, one embodiment of a heating element is shown in more detail. Internally, the heating element can be a winding coil of a conductive web 100 that attaches to the power supply at the two terminals 102 and 104 as shown in FIG. 14A. The reason for the coil design is to focus and disperse the heating action throughout the pad.

Figure 14B:
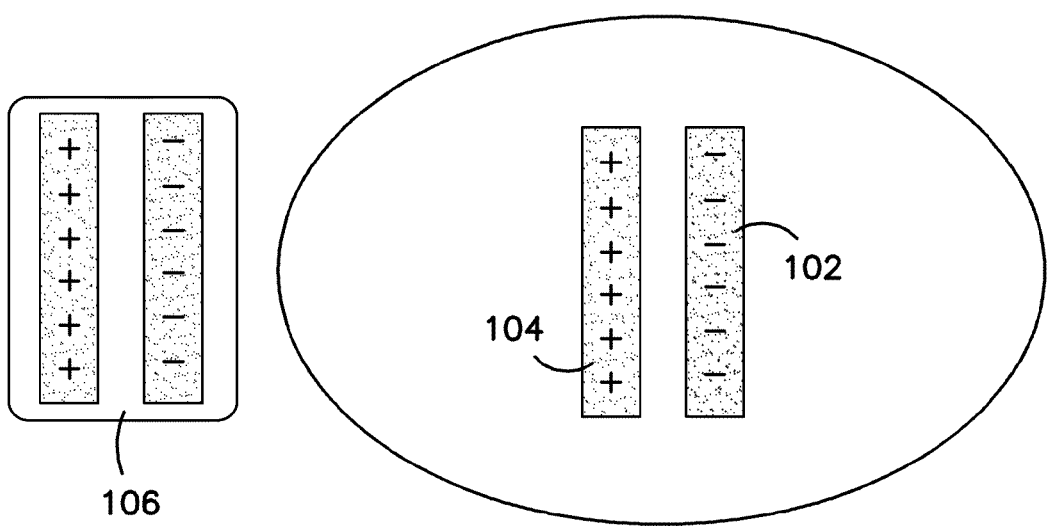

As shown in FIG. 14B, the two terminals 102 and 104 can include an attachment area for matching with a power source 106. If desired, the attachment area including the terminals 102 and 104 can be labeled to match the power source 106 for easy placing of the power source.

When constructing a heating device as shown in FIGS. 14A and 14B, the application of ultrasonic energy to the nonwoven web 100 may be used for several different functions. For instance, light amounts of ultrasonic energy may be used to produce the electrical heating elements in order to increase the resistance in the elements. Increasing the resistance may cause the heating elements to heat faster.

In addition, ultrasonic energy can be used to also form non-conductive areas for creating circuitry within the web for attachment to the power supply.

Figure 4:
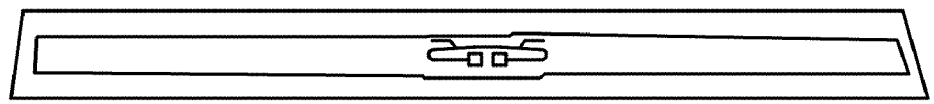
FIGS. 4-18 are various views of a number of products and processes described herein.

In yet another embodiment, a product made in accordance with the disclosed technology can be used as a radiating element. The radiating element can act as a simple half-wave dipole antenna allowing for a low cost data transmission system. In further application, the radiating element can be used to construct a unique low cost RFID tag, shown in FIG. 4. Additionally, the radiating element can be incorporated in smart clothing as described above for user-specific data transmission. The conductive web provides electrical properties when used as a radiating element at parity compared to current electrical conductors used as traditional radiating elements. Further, the disclosed technology is significantly cheaper to produce, which leads to reducing the overall cost of manufacturing current products by replacing traditional radiating elements with conductive web elements.

Figure 5:
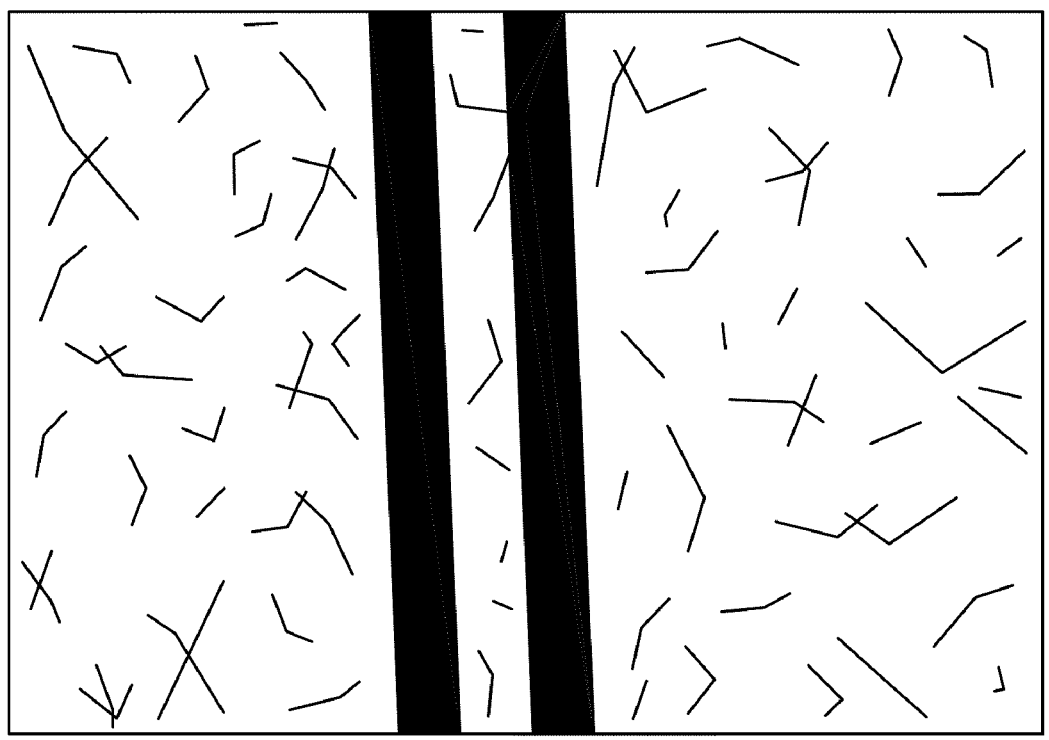

There are multiple ways of incorporating the disclosed technology into a given substrate like paper, nonwovens, or synthetics. The key is to create the appropriate shape/length of the conductive web required for it to function as a radiating element. For example, the appropriate size and shape of the conductive material can be carved out of the web by using an ultrasonic bonding technology as described above. Referring to FIG. 5, this tool imparts enough energy into the web to break the brittle conductive fiber material but leaves the substrate behind. In this manner, radiating elements having a carefully controlled size and shape can be produced in a high speed manner by subjecting a conductive nonwoven web made in accordance with the present disclosure to an ultrasonic bonding device.

Additionally, "zoning" the strip of conductive material into the substrate creates the appropriate shape/length necessary. This can be achieved by bonding the material using a wet process. The disclosed technology is known to retain its strength when wet. The material forms hydrogen bonds with the substrate during the forming and compressing process and eventually adheres to it when dried.

Figure 7:
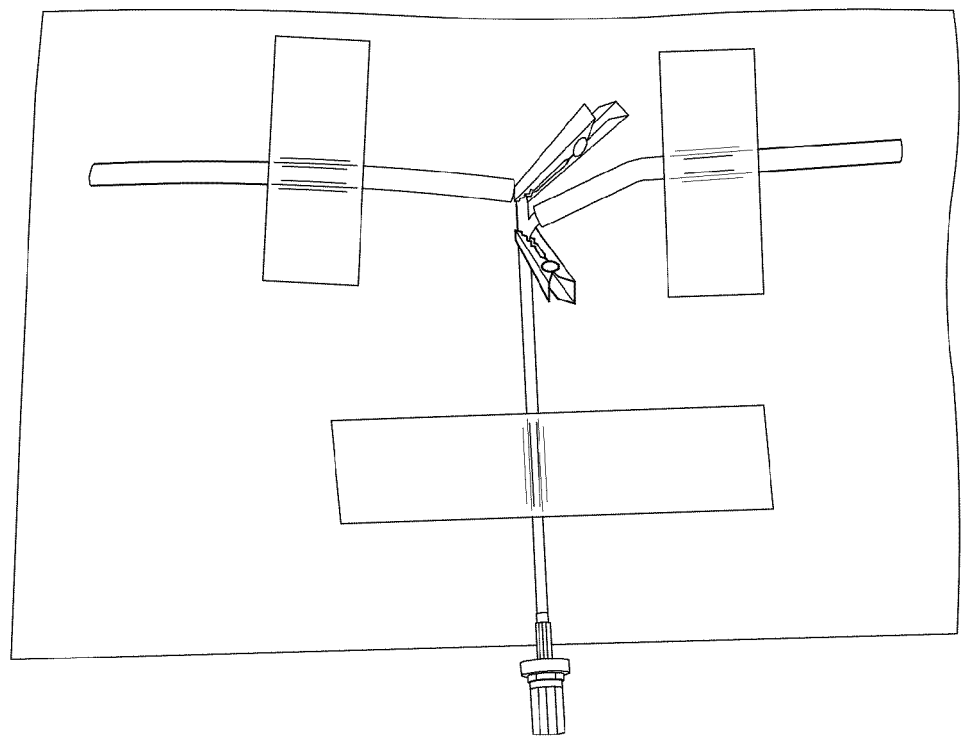
Figure 8:
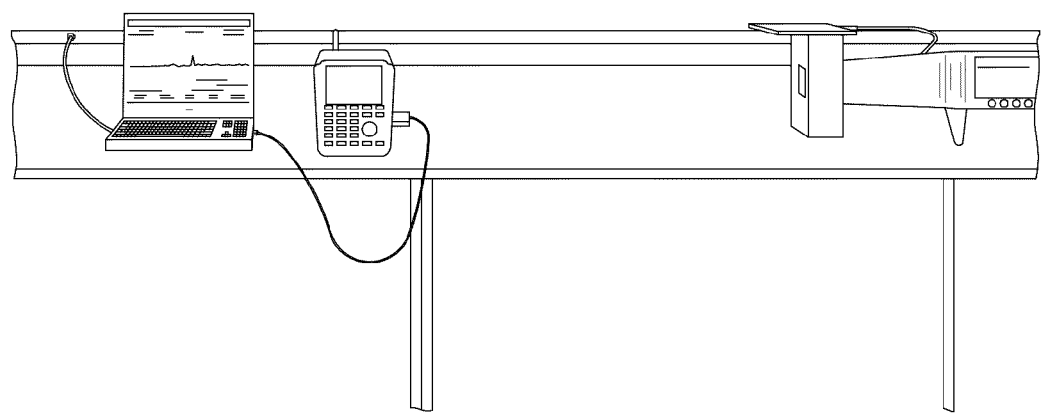

In FIG. 7, a prototype of a half-wave dipole antenna was constructed using two identical strips of the conductive nonwoven material attached to a pre-existing antenna base required for connection to a signal generator. The shape and size of the conductive material can be important and need to be appropriately selected for the frequency band of operation. As described above, ultrasonic energy can be used to carefully control the size and shape of the antenna in a high speed process. In this case the dipole antenna was appropriately designed to radiate at 915 MHz (center frequency of 902-928 MHz ISM band). The effective length of a half wavelength dipole antenna at 915 MHz is 164 mm. A simple test was conducted to measure the radiated power of the conductive material half-wave dipole antenna. This test setup, shown in FIG. 8, includes a signal generator that was used to transmit a 10 dBm signal at 900 MHz from the antenna. A calibrated antenna at 900 MHz connected to a spectrum analyzer was used to measure the received signal when placed 1 m away from the conductive web antenna. Power received at the calibrated antenna was measured to be −29.5 dBm, showing functionality. Compared to a standard calibrated dipole antenna at 900 MHz, the results were comparable.

Figure 9:
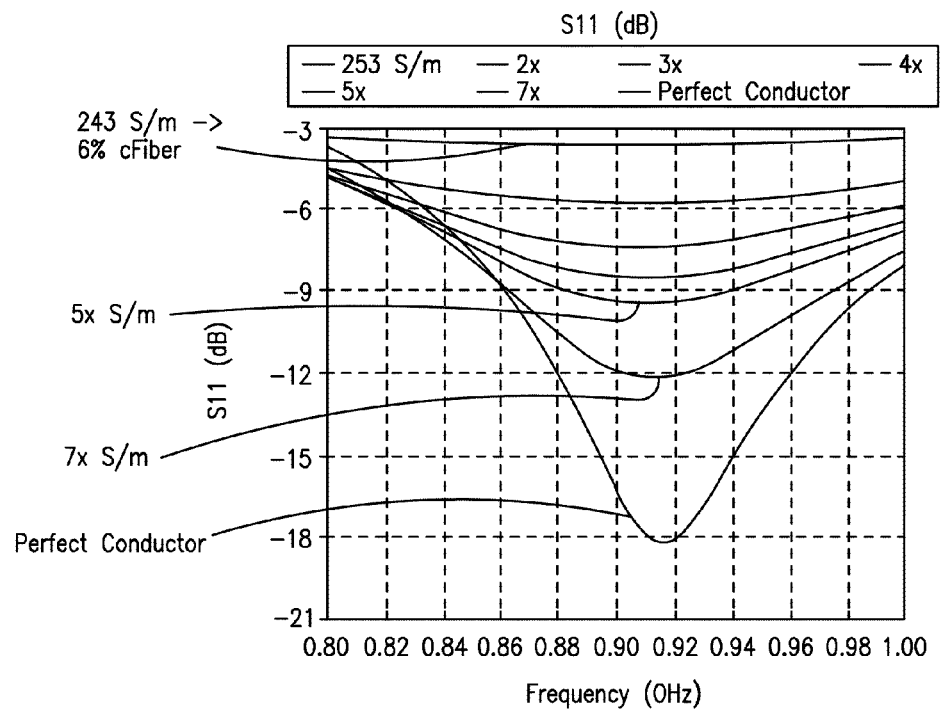
Figure 10:
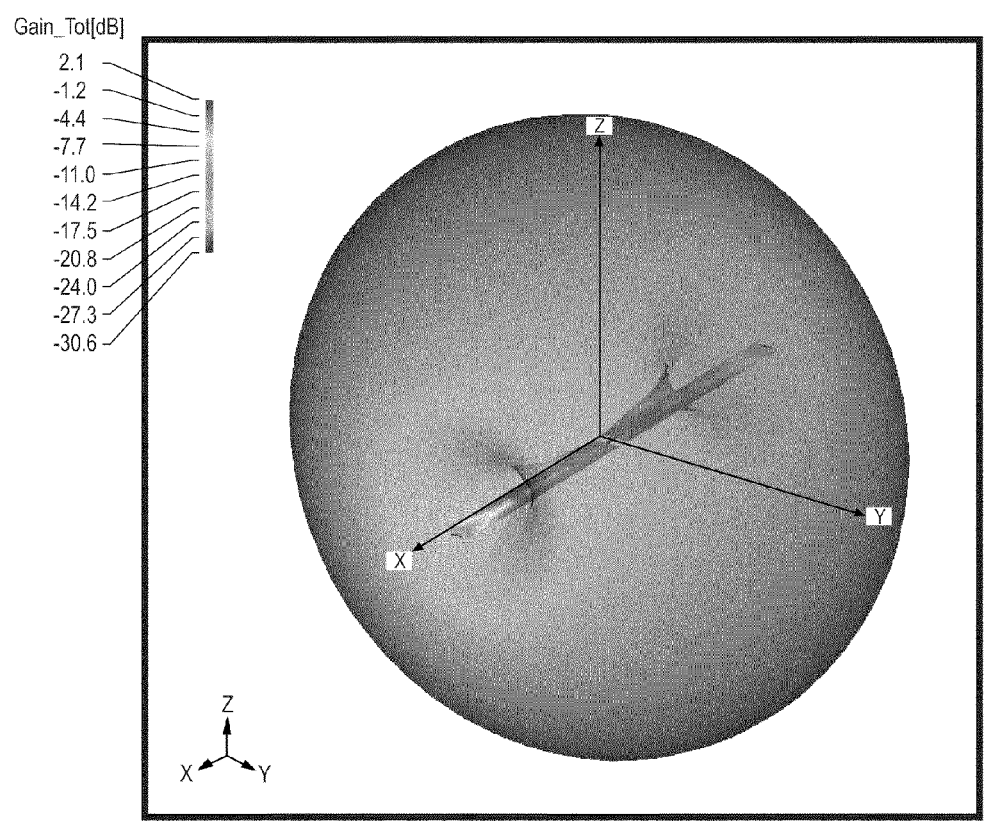

In FIG. 10, two equal strips of conductive material attached to a pre-existing RFID chip create a functional UHF RFID tag. The experiment described above was taken one step forward and the sensitivity of the RFID tag constructed using conductive web was tested. The sensitivity of this conductive web RFID tag was measured by monitoring the minimum power required by the RFID tag to respond to RFID reader antenna placed precisely one meter away from it. The sensitivity of conductive web RFID tag was estimated to be −5.1 dBm. This is comparable to commercially available RFID tags. The conductive properties of the disclosed technology play an important role in determining the radiation properties of the antenna. Referring to FIG. 9, the conductivity of the material needs to be about 1000 S/m for it to be effectively used as a UHF RFID tag. This can be effectively achieved by incorporating 25-30% conductive material into the web. The radiation pattern of this RFID tag is shown in FIG. 10. The appropriate dimensions of this particular RFID tag design are 144 mm long and 8 mm wide.

By using the disclosed technology as a radiating element and incorporating it into smart fabric, data transmission from the fabric to an external receiver is possible. As described above, such smart fabric can create smart clothes for transmitting measured physiological data of humans and animals alike. For instance, a smart shirt on a human can transmit the heart rate, body temperature, etc. of the user to an external receiver. By using conductive web for a radiating element, the antenna not only has the benefit of being a flexible fabric, allowing for comfortable fit to any body, but the material is inexpensive and durable making such an application commercially viable. In addition, the conductive web of the present disclosure can be used not only for a radiating element, but can also be designed to include an electrical circuit that may be directly incorporated into the RFID device. The electrical circuit can be formed using ultrasonic energy to form non-conductive zones. The electrical circuit can be part of the same conductive web used for the radiating element or may comprise a separate piece of material. In this manner, the electronic device may be more easily incorporated into an article of clothing.

A unique application was developed using the disclosed technology as a barrier to electromagnetic energies (EMI) radiated at certain frequencies. The product may or may not be disposable. The EMI shielding element can be integrated with commercially available wallpaper. Further, the shielding element can be incorporated in building insulation materials, like Dupont's Tyvek home-wraps. The shielding element can be used to create effective apparel for radiation protection. To ensure functionality, a shielding element must be developed for a specific type of signal to be protected against; consequently current EMI shielding technologies require an expensive development and manufacturing process. The disclosed technology provides unique applications that can be manufactured to specific signals at low cost and large volumes, unlike current EMI shielding technologies.

Figure 11:
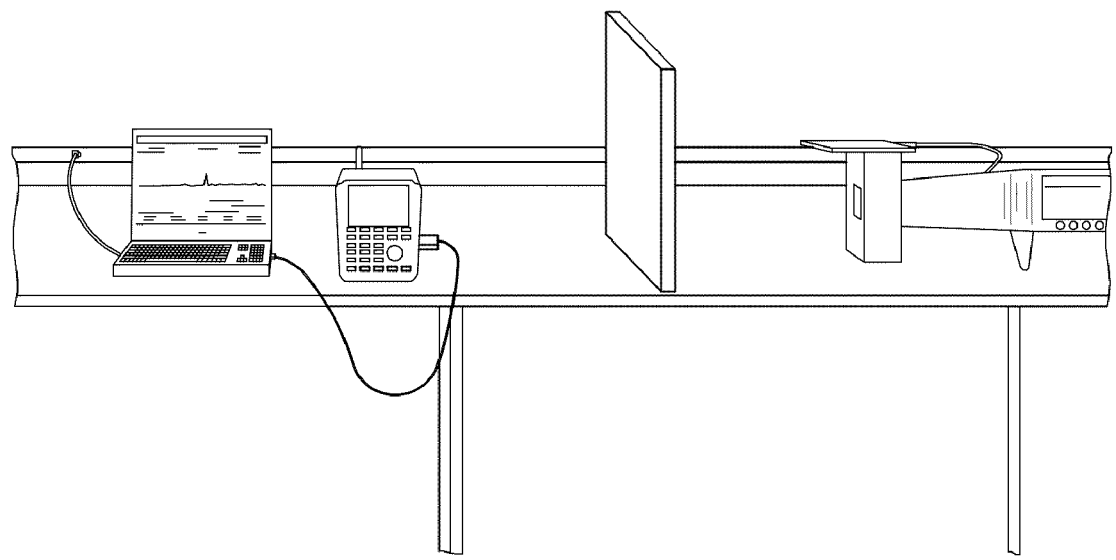
Figure 12:
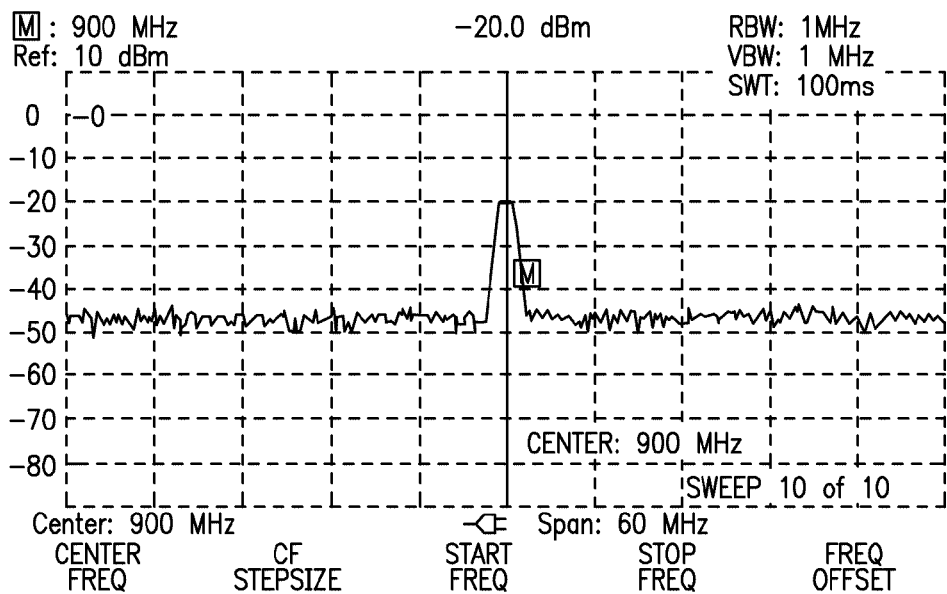
Figure 13:
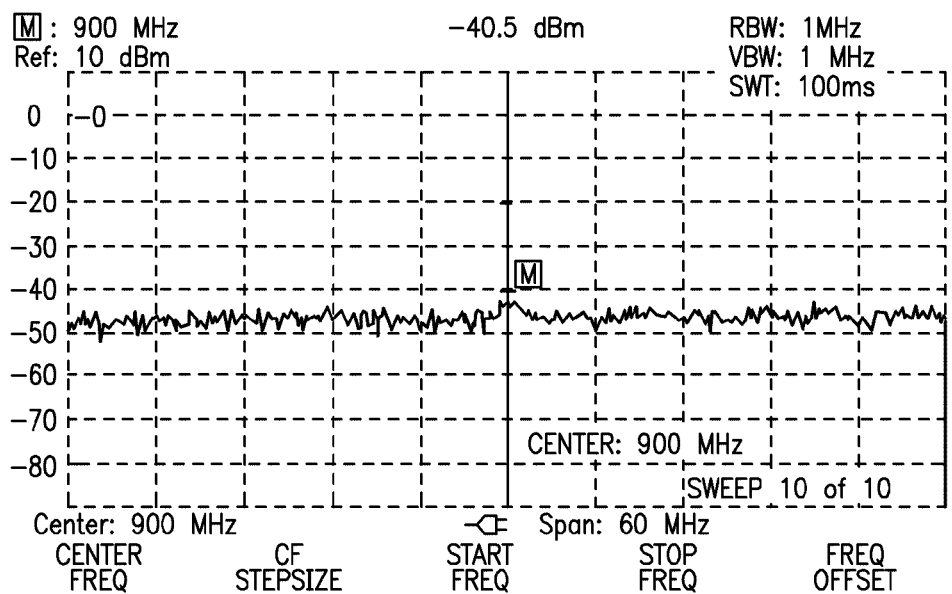

Referring to FIG. 11, for demonstration of application, the setup of a developed test for the effectiveness of the shielding element is shown. The test setup consisted of two calibrated dipole antennas, one used as a receiver and the other as a transmitter. The transmitter antenna was connected to a signal generator that was set at 900 MHz and 10 dBm. The receiver antenna was placed one meter away from the transmitter. The test was performed first without the EMI shielding element placed between the two antennas, and then once again with the shielding element in place. The conductive web was electrically grounded to the wall and thus shielding the receiver from the transmitted signal. In FIGS. 12 and 13, the power measured at the receiver antenna is shown without and with the EMI shielding element respectively. There was 20 dB reduction in signal which is equivalent to one thousand times lower than before. Therefore, this simple experiment demonstrated that the disclosed technology can be used as an EMI shield.

In still another embodiment of the present disclosure, a conductive nonwoven material may be used to produce a smart packaging element.

The smart packaging element can be used for monitoring a parcel's condition and treatment throughout handling. In a further application, the smart packaging element can be incorporated in a packaging material, such as corrugate cardboard, to be used for RFID antenna functionality. The conductive web provides opportunities in packaging that were previously either impossible to complete or very cost intensive. The vast majority of smart packaging elements are being implemented in food and beverage industries to ensure freshness of shipped commodities. However, current smart packaging elements are cost intensive and impractical on the large scale. The use of conductive web for a smart packaging element can make some applications of smart packaging a possibility on the large scale due to its ease of use and very low cost.

The smart packaging element made in accordance with the disclosed technology can be developed to monitor numerous conditions of an object throughout handling. For example, during storage, the conductive web can be used to determine if the object had come in contact with excessive moisture that could potentially hinder the functionality of the product or the structural integrity of the packaging itself. Additionally, a conductive web can be used to create a protective seal on the package in order to ensure that the contents of the package are not accessed before a prescribed date. Current technology implements special adhesive tapes to ensure security of the package, however, with integration with a technology like RFID, the conductive web can alert the owner of the shipment which specific package was opened, and when. Such a technology would be beneficial in shipping products prior to a wide release.

By incorporating the conductive web technology into the corrugate material of packages it can be used as an extremely robust antenna when connected to a pre-existing RFID tag. Integrating conductive web into corrugate material simplifies the process of creating a RFID enabled package. Currently, existing RFID tags must have self contained antenna, which increase the size and cost of producing the tags. With conductive web integrated in the corrugate material acting as an antenna, the RFID tag can be simplified by not containing its own self contained antenna, but just connect to the conductive web creating a functional RFID tag. The use of the disclosed technology decreases production time, process, and cost over current RFID technology. Additionally, by using a conductive web containing at least 3% carbon fiber, the integrated corrugate can be use to discharge static build up when shipping electronic devices.

These and other modifications and variations to the present disclosure may be practiced by those of ordinary skill in the art, without departing from the spirit and scope of the present disclosure, which is more particularly set forth in the appended claims. In addition, it should be understood that aspects of the various aspects of the present disclosure may be interchanged either in whole or in part. Furthermore, those of ordinary skill in the art will appreciate that the foregoing description is by way of example only, and is not intended to limit the disclosure so further described in such appended claims.

What is claimed is:

1. A conductive material comprising:
   a conductive nonwoven web comprising a first fiber combined with a second fiber, the first fiber comprising conductive fibers, the conductive fibers comprising carbon fibers, the second fiber comprising pulp fibers, synthetic fibers, or mixtures thereof, the conductive fibers being present in the nonwoven web in an amount from about 5% by weight to about 50% by weight; and;
   wherein the conductive nonwoven web has a generally uniform composition and includes conductive zones and non-conductive zones, the non-conductive zones comprising ultrasonically treated areas wherein at least the conductive fibers have been broken.

2. A conductive material as defined in claim 1, wherein the non-conductive zones have a resistance that is at least four times greater than a resistance of the conductive zones.

3. A conductive material as defined in claim 1, wherein the second fibers comprise pulp fibers.

4. A conductive material as defined in claim 1, wherein the second fibers comprise synthetic fibers, the synthetic fibers being formed from a thermoplastic polymer.

5. A conductive material as defined in claim 1, wherein the ultrasonically treated areas comprise areas where the carbon fibers have been shattered causing electrical discontinuities.

6. A conductive material as defined in claim 1, wherein the conductive zones and the non-conductive zones form an electric circuit in the web.

7. A conductive material as defined in claim 1, wherein the conductive web is bonded to a second conductive web, the ultrasonically treated areas bonding the first web to the second web.

8. A conductive material as defined in claim 7, wherein the ultrasonically treated areas comprise non-conductive zones contained in both conductive webs.

9. A conductive material as defined in claim 7, wherein the ultrasonically treated areas form an electrical connection between the first conductive web and the second conductive web adjacent the non-conductive zones by forming fiber connections between the first and second conductive webs.

10. An electronic switch comprising the conductive nonwoven web defined in claim 1, the conductive nonwoven web being spaced from an opposing conductive layer and wherein an electrical connection is formed between the conductive nonwoven web and the opposing conductive layer when the conductive nonwoven web and the opposing conductive layer are pressed together.

11. An electronic switch as defined in claim 10, wherein the opposing conductive layer comprises a second conductive nonwoven web.

12. An electronic switch as defined in claim 10, wherein a non-conductive layer is positioned in between the conductive nonwoven web and the opposing conductive layer, the non-conductive layer including an aperture through which an electrical connection is made between the conductive nonwoven web and the opposing conductive layer when the conductive nonwoven web and the opposing conductive layer are pressed together.

13. An electronic article comprising:
an exterior surface designating a plurality of keys;
a first conductive layer positioned below the keys;
a second conductive layer spaced from the first conductive layer and wherein, when one of the keys is pressed, an electrical connection is made between the first conductive layer and the second conductive layer; and
wherein the first conductive layer or the second conductive layer comprises the conductive nonwoven web defined in claim 1.

14. An electronic article as defined in claim 13, wherein the first conductive layer and the second conductive layer comprise conductive nonwoven webs.

15. An electronic article as defined in claim 13, further comprising a non-conductive layer positioned in between the first conductive layer and the second conductive layer, the non-conductive layer defining a plurality of apertures that correspond in location to each of the keys located on the exterior surface.

16. An electronic article as defined in claim 15, wherein the exterior surface comprises a surface of the first conductive layer, the first conductive layer comprising the conductive nonwoven web.

17. An electronic article as defined in claim 15, wherein the plurality of keys are printed on the exterior surface of the conductive nonwoven web.

18. An electronic article as defined in claim 13, further comprising a cover layer and a backing layer, the first conductive layer and the second conductive layer being positioned in between the cover layer and the backing layer, the cover layer defining the exterior surface where the plurality of keys are located.

19. A product as defined in claim 1, wherein the conductive nonwoven web comprises a wet laid web.

20. A product as defined in claim 1, wherein the conductive nonwoven web contains carbon fibers combined with synthetic fibers, the conductive nonwoven web comprising a coform web.

21. A product as defined in claim 1, wherein the conductive nonwoven web contains carbon fibers combined with synthetic fibers, the conductive nonwoven web comprising a hydroentangle web.

22. A product as defined in claim 1, wherein the carbon fibers contained in the conductive nonwoven web conductive nonwoven web have a length of from about 1 mm to about 6 mm and have a purity of at least of about 85%.

23. An article of clothing incorporating the electronic switch defined in claim 10.

24. An illuminating sign incorporating the electronic switch defined in claim 10.

25. An RFID device including a dipole antenna constructed from the conductive material defined in claim 1.

26. A heating device incorporating the conductive material defined in claim 1.

* * * * *